United States Patent
Kondo et al.

(10) Patent No.: US 8,469,164 B2
(45) Date of Patent: Jun. 25, 2013

(54) DAMPER

(75) Inventors: Takuhiro Kondo, Tokyo (JP); Hirofumi Inoue, Toyota (JP)

(73) Assignees: Kayaba Industry Co., Ltd., Minato-ku (JP); Toyota Jidosha Kabushiki Kaisha, Toyota-shi (JP)

( * ) Notice: Subject to any disclaimer, the term of this patent is extended or adjusted under 35 U.S.C. 154(b) by 1251 days.

(21) Appl. No.: 12/298,196

(22) PCT Filed: Apr. 10, 2007

(86) PCT No.: PCT/JP2007/058226
§ 371 (c)(1),
(2), (4) Date: Oct. 23, 2008

(87) PCT Pub. No.: WO2007/125770
PCT Pub. Date: Nov. 8, 2007

(65) Prior Publication Data
US 2009/0065314 A1    Mar. 12, 2009

(30) Foreign Application Priority Data
Apr. 27, 2006 (JP) .................................. 2006-122900
Apr. 27, 2006 (JP) .................................. 2006-122901

(51) Int. Cl.
*F16F 9/34*    (2006.01)

(52) U.S. Cl.
USPC ............... 188/299.1; 188/266.1; 188/266.2; 188/266.3; 188/267; 267/217; 267/221; 267/225; 267/226

(58) Field of Classification Search
USPC ......... 188/266.1–266.3, 267, 299.1; 267/217, 267/221, 225, 226
See application file for complete search history.

(56) References Cited

U.S. PATENT DOCUMENTS

| | | | | |
|---|---|---|---|---|
| 1,928,816 A * | 10/1933 | Grayson | ......................... | 280/90 |
| 2,252,771 A * | 8/1941 | Katcher | ......................... | 188/280 |
| 2,861,795 A * | 11/1958 | Blake | ............................ | 267/225 |
| 4,183,509 A * | 1/1980 | Nishikawa et al. | ........... | 267/218 |
| 4,671,392 A * | 6/1987 | Wossner | .................... | 188/266.3 |
| 5,678,847 A * | 10/1997 | Izawa et al. | ................ | 280/5.515 |
| 2005/0211517 A1* | 9/2005 | Carlson | ........................ | 188/267 |

FOREIGN PATENT DOCUMENTS

| | | |
|---|---|---|
| JP | 4-133040 | 12/1992 |
| JP | 8197931 | 8/1996 |
| JP | 2001-180244 | 7/2001 |
| JP | 2004-100785 | 4/2004 |
| JP | 2005-256887 | 9/2005 |

\* cited by examiner

*Primary Examiner* — Bradley King
*Assistant Examiner* — Mahbubur Rashid
(74) *Attorney, Agent, or Firm* — McGlew and Tuttle, P.C.

(57) ABSTRACT

A damper (D1) comprising an actuator A connected to a sprung member (B) side of a vehicle, the actuator having a motion converting mechanism (T) for converting a linear motion into a rotational motion and a motor (M) to which the rotational motion resulting from the conversion by the motion converting mechanism (T) is transmitted; a hydraulic damper (E), the hydraulic damper (E) having a cylinder (C), a piston (P) inserted slidably into the cylinder (C) and defining two pressure chambers within the cylinder (C), and a rod (R) connected at one end thereof to the piston (P), the linear motion of the actuator (A) being transmitted to one of the rod (R) and the cylinder (C), the other of the rod (R) and the cylinder (C) being connected to an unsprung member (W) side of the vehicle; a spring (1) accommodated within one of the two pressure chambers and biasing the hydraulic damper (E) in a damper compressing direction; and a spring (2) accommodated within the other pressure chamber and biasing the hydraulic damper (E) in a damper extending direction.

17 Claims, 10 Drawing Sheets

DAMPER

FIELD OF ART

The present invention relates to an improvement of a damper for suppressing a relative movement between a vehicle body and an axle with use of an electromagnetic force generated in a motor.

BACKGROUND ART

As a damper there has been proposed is a damper having a hydraulic damper and an actuator for imparting a propelling force to a piston rod of the hydraulic damper, as is disclosed in Japanese Patent Laid-Open Publication No. 2001-180244. According to this proposed damper a rod of the hydraulic damper is formed in a tubular shape and a female screw is formed on the inner periphery side of the rod. Further, a shaft connected at one end thereof to a rotor of a motor and at an opposite end thereof to a male screw member threadably engaged with the female screw of the rod is inserted into the rod of the hydraulic damper, and the piston rod of the hydraulic damper is constituted by the shaft and the rod.

In the proposed damper, a force generated when the shaft and the rod are relatively moved axially by the motor to extend or retract the piston rod is added to a damping force generated in the hydraulic damper, that is, motor torque is converted to a force acting in the direction of the relative movement between the shaft and the rod, thereby causing the said force to act additionally on the damping force of the hydraulic damper to damp oscillation.

In Japanese Patent Laid-Open Publication No. H08 (1996)-197931 there is disclosed a damper comprising a coil spring which resiliently supports a vehicle body side, i.e., a sprung member side of a vehicle, a screw shaft threadably and rotatably engaged with a ball screw nut connected to an axle side, i.e., an unsprung member side, a motor connected to one end of the screw shaft and supported by the sprung member resiliently by interposition between a pair of springs, and a hydraulic damper fixed to the vehicle body side to damp vertical oscillation of the motor. A relative movement between the vehicle body and the axle is controlled actively with rotating torque generated by the motor.

DISCLOSURE OF THE INVENTION

However, the above conventional dampers involve the following problems.

In the damper disclosed in the above laid-open publication 2001-180244, since the piston rod is extended forcibly by the motor, it become uncertain in which position the piston of the hydraulic damper occupies with respect to a cylinder.

As a result, for example, when such a high frequency oscillation as a thrusting-up oscillation from a road surface is inputted in a state that the piston is positioned in the vicinity of lower end of the cylinder, the piston comes into collision with a base valve or the bottom of the cylinder. The resulting impact may be transmitted to the sprung member of the vehicle body and impair ride comfort in the vehicle or in the worst case may lead to damage of the hydraulic damper.

Moreover, if the piston is positioned near an upper end of the cylinder, there may occur collision of the piston with an upper portion of the cylinder in case of bumping of the vehicle body. Also in this case, as in the above case, the ride comfort in the vehicle is deteriorated and damage of the hydraulic damper may result. Thus, a problem exists in point of reliability of the damper.

Further, if the position of the piston relative to the cylinder is monitored constantly and control is made so that the piston assumes a central position, it is required that the piston rod be extended or retracted to return the piston to its neutral position during travel of the vehicle despite it being unnecessary for attitude control. As a result, the attitude of the vehicle body changes and uneasy feeling or a sense of incongruity is given to the operator of the vehicle. Thus, even if the above control is made, it does not lead to improvement of the ride comfort in the vehicle.

Next, in the damper disclosed in the above laid-open publication No. H08 (1996)-197931, since the motor is subjected to centering through a pair of springs, the piston of the hydraulic damper is established its position relative to a cylinder. Consequently, the problems involved in the damper disclosed in the above laid-open publication 2001-180244 are solved.

The damper in question is provided with a motion converting mechanism composed of a screw shaft and a ball screw nut for converting the torque of the motor as a damping force generation source into a damping force to act in a linear direction. Since an inertial mass of a rotating member is large, and coupled with friction of a rotating system, the motor and the motion converting mechanism cannot perform an extending/contracting motion at the time of input of a high-frequency oscillation. In this connection, the high-frequency oscillation is absorbed by the foregoing hydraulic damper and a pair of springs.

In this damper, however, at the time of input of a high-frequency oscillation as described above, the motor is oscillated directly by the high-frequency oscillation. Thus, a problem exists in point of reliability of the damper partly because the high-frequency oscillation is high in acceleration.

Further, the mass of the motor and that of the screw shaft are large, so in the construction wherein the motor and the screw shaft are supported resiliently by a pair of springs, the motor and the screw shaft also oscillate largely and the oscillation of the unsprung member becomes easier to be transmitted to the sprung member. This may lead to deterioration of the ride comfort.

The present invention has been accomplished in view of the above-mentioned problems and it is an object of the invention to provide a damper that can improve reliability and ride comfort in a vehicle while adopting the construction of generating a damping force by utilizing an electromagnetic force of a motor.

For achieving the above-mentioned object, in one aspect of the present invention there is provided a damper comprising an actuator connected to a sprung member side of a vehicle, the actuator having a motion converting mechanism for converting a linear motion into a rotational motion and a motor to which the rotational motion resulting from the conversion by the motion converting mechanism is transmitted; a hydraulic damper, the hydraulic damper having a cylinder, a piston inserted slidably into the cylinder and defining two pressure chambers within the cylinder; and a rod connected at one end thereof to the piston, the linear motion of the actuator being transmitted to one of the rod and the cylinder, the other of the rod and the cylinder being connected to an unsprung member side of the vehicle; a spring accommodated within one of the two pressure chambers and biasing the hydraulic damper in a damper compressing direction; and a spring accommodated within the other pressure chamber and biasing the hydraulic damper in a damper extending direction.

In another aspect of the present invention there is provided a damper comprising an actuator connected to a sprung member of a vehicle, the actuator having a motion converting mechanism for converting a linear motion into a rotational motion and a motor to which the rotational motion resulting from the conversion by the motion converting mechanism is transmitted; a hydraulic damper, the hydraulic damper having a cylinder, a piston inserted slidably into the cylinder and defining two pressure chambers within the cylinder; and a rod connected at one end thereof to the piston, the linear motion of the actuator being transmitted to one of the rod and the cylinder, the other of the rod and the cylinder being connected to an unsprung member side of the vehicle; a spring for biasing the hydraulic damper in a damper compressing direction and an air spring for biasing the hydraulic damper in a damper extending direction.

In a further aspect of the present invention there is provided a damper comprising an actuator connected to a sprung member side of a vehicle, the actuator having a motion converting mechanism for converting a linear motion into a rotational motion and a motor to which the rotational motion resulting from the conversion by the motion converting mechanism is transmitted; an air damper, the air damper having a cylinder, a piston inserted slidably into the cylinder and defining two pressure chambers within the cylinder; and a rod connected at one end thereof to the piston, the linear motion of the actuator being transmitted to one of the rod and the actuator, the other of the rod and the cylinder being connected to an unsprung member side of the vehicle; and a spring for biasing the air damper in a damper compressing direction.

According to the damper of the present invention, the hydraulic damper or the air damper is connected in series with the actuator and is disposed on the unsprung member side, so when a high-frequency oscillation such as, for example, oscillation relatively large in acceleration is inputted to the unsprung member in the case where the vehicle is running on a bad road or strikes on a projection of a road surface, the hydraulic damper or the air damper absorbs energy of the oscillation and acts so as to make transmission of the oscillation to the actuator side difficult, coupled with an oscillation transfer suppressing effect induced by the spring and the air spring.

Thus, the hydraulic damper or the air damper absorbs the aforesaid oscillation and the spring and the air spring exhibit the oscillation transfer suppressing effect, thereby suppressing the transfer of the oscillation to the actuator. Therefore, in the damper of the present invention, the ride comfort in the vehicle is not deteriorated even in such a case.

Moreover, as noted above, since the direct exertion of a high-frequency oscillation on the actuator is prevented by the hydraulic damper or the air damper, the transfer of particularly a high-frequency oscillation large in acceleration to the motor is suppressed, so that the reliability of the actuator as a main component of the damper is improved and it is possible to solve the problems involved in the conventional dampers and improve the damper reliability.

Further, there are used a spring for biasing the hydraulic damper in a damper compressing direction and a spring for biasing the hydraulic damper in a damper extending direction, or a spring for biasing the hydraulic damper in a damper compressing direction and an air spring for biasing the hydraulic damper in a damper extending direction, or there is used a spring for biasing the air damper which acts as an air spring in a damper compressing direction. Therefore, there is attained a function of suppressing the transfer particularly of a high-frequency oscillation of the unsprung member to the actuator side, i.e. the sprung member side, and at the same time there is attained a function of moving the piston back to a predetermined position with respect to the cylinder of the hydraulic damper or the air damper.

That is, the problem involved in the conventional dampers such that the piston interferes with the cylinder, resulting in deterioration of the ride comfort in the vehicle or deterioration of the damper reliability, is solved.

Further, in the case where the spring for biasing the hydraulic damper in the damper compressing direction and the spring for biasing the hydraulic damper in the damper extending direction are received within the cylinder of the hydraulic damper, the damper can be slimmed and reduced in size and the diameter of each spring can be reduced as compared with the construction wherein spring bearing members and springs are disposed on for example the outer periphery side of the hydraulic damper. Accordingly, even if the wire rod diameter is made smaller than in case of disposing springs on the outer periphery side of the hydraulic damper, it is possible to ensure the same spring constant and not only the cost of each spring can be reduced by that much, but also the weight of the damper can be reduced. Besides, since it is not necessary to adopt such a construction as disposing spring bearing members and springs on the outer periphery side of the hydraulic damper, the diameter of the outer periphery of the hydraulic damper can so much be enlarged. In this case, it is possible to increase the amount of liquid within the hydraulic damper and hence possible to suppress a change in temperature of the liquid and prevent a change in damping force characteristics of the hydraulic damper.

In case of using an air spring as one of the two spring elements for biasing the hydraulic damper in damper compressing and extending directions respectively, it is possible to reduce the weight and size of the damper.

Moreover, in case of adopting an air damper in the damper, a further reduction of the damper weight becomes possible, the oscillation transfer gain to the sprung member can be diminished and the ride comfort in the vehicle can be further improved; besides, the oscillation transfer suppressing effect for the actuator side is enhanced, whereby the damper reliability is further improved.

BEST MODE FOR CARRYING OUT THE INVENTION

The present invention will be described hereunder by way of embodiments thereof illustrated in the accompanying drawings.

Figure 1:
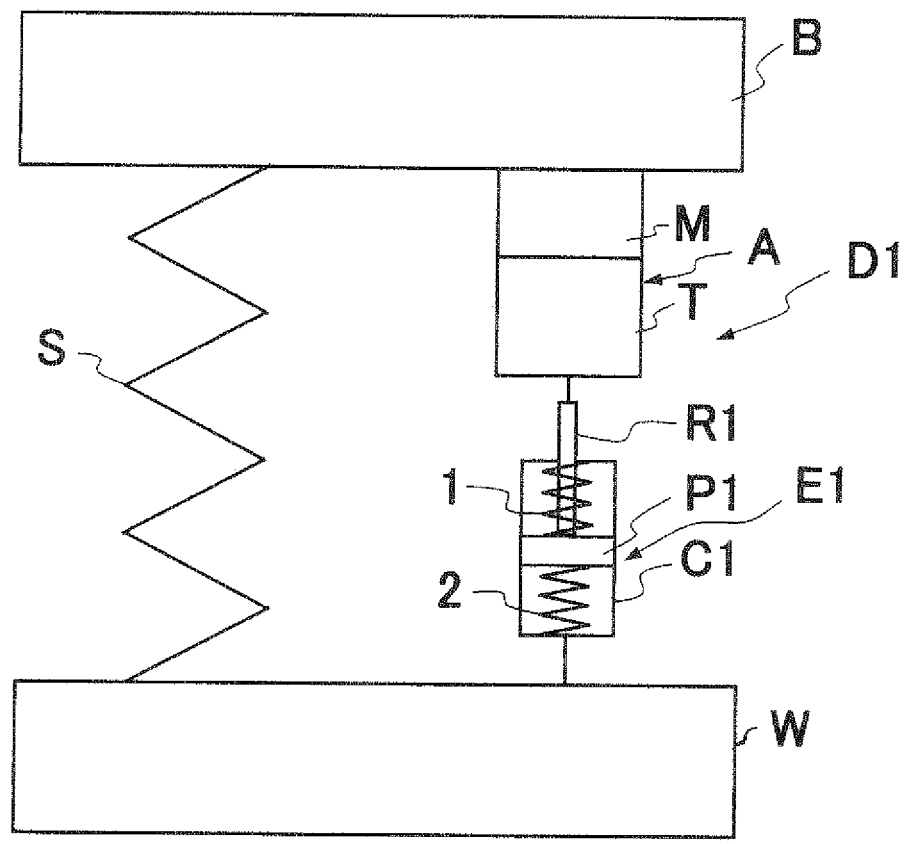
FIG. 1 is a conceptual diagram of a damper according to a first embodiment of the present invention.

As shown in FIG. 1, a damper D1 according to a first embodiment of the present invention is interposed between an unsprung member W and a sprung member B and in parallel with a suspension spring S. The damper D1 is basically made up of a hydraulic damper E1 connected to the unsprung member W, an actuator A connected in series with the hydraulic damper E1 and also connected to the sprung member B side, and a spring 1 and a spring 2 both interposed between the actuator A and the unsprung member W and in parallel with the hydraulic damper E1, the spring 1 biasing the hydraulic damper E1 in a damper compressing direction and the spring 2 biasing the hydraulic damper E1 in a damper extending direction.

The actuator A includes a motion converting mechanism T for converting a linear motion to a rotational motion and a motor M to which the rotational motion resulting from the conversion by the motion converting mechanism T is transmitted. For example, the motion converting mechanism T is constituted by a feed screw mechanism comprising a screw shaft and a screw nut or such a mechanism as rack and pinion or worm gear.

In the case of the actuator A, the motor M is used as a drive source, so when adopting the rotating member, i.e., the feed screw mechanism, in the motion converting mechanism T, a rotational motion of a rotating member which is either the screw shaft or the screw nut is transmitted to the motor M. In case of driving the motor M by supplying electric energy thereto, the member on the linear motion side can be allowed to perform a linear motion, that is, the function as an actuator can be exhibited.

When a rotational motion is inputted to the motor M forcibly from the rotating member side, the motor, on the basis of induced electromotive force, generates torque for suppressing the rotational motion of the rotating member and thus functions so as to suppress the linear motion of the liner motion-side member. That is, in this case, the motor M regenerates externally inputted kinetic energy and converts it into electrical energy and the linear motion of the linear motion-side member is suppressed with the resulting regenerated torque.

Thus, in the actuator A, thrust can be imparted to the linear motion-side member by making the motor M generate torque positively. In the case where the linear motion-side member is moved forcibly with an external force, such a motion can be suppressed with the regenerated torque from the motor M.

In the damper D1, with the thrust and torque produced by the actuator A, not only it is possible to suppress a relative movement between the sprung member B and the unsprung member W, but also the attitude of the sprung member B, more particularly the vehicle body, can be controlled, making the most of the function as the actuator. Thus, the function as an active suspension can also be exhibited.

It suffices for the motor M and the rotating member in the motion converting mechanism T to be connected so as to permit transfer of a rotational motion and therefore, for example, a reduction mechanism, a link mechanism permitting the transfer of a rotational motion, or a joint, may be interposed between the motor M and the rotating member.

As the motor M there may be used any of various types insofar as the motor adopted can fulfill the above function. For example, there may be used a DC motor, an AC motor, an induction motor, or a synchronous motor.

The hydraulic damper E1, although a concrete construction thereof will be described later, includes a cylinder C1, a piston P1 inserted slidably into the cylinder C1 and defining two pressure chambers within the cylinder C1, and a rod R1 connected at one end thereof to the piston P1. The hydraulic damper E1 generates a predetermined damping force at the time of extension or contraction.

The hydraulic damper E1 used in the damper of this embodiment is interposed between the actuator A and the unsprung member W mainly for the purpose of absorbing a high-frequency oscillation. More specifically, one end of the hydraulic damper E1 is connected to the linear motion-side member of the actuator A, while an opposite end thereof is connected to the unsprung member V.

The connection between the hydraulic damper E1 and the actuator A can be done by connecting one of the cylinder C1 and the rod R1 in the hydraulic damper E1 to the linear motion-side member of the actuator A. On the other hand, the other of the cylinder C1 and the rod R1 is connected to the unsprung member W.

Accordingly, it is optional whether the hydraulic damper E1 is to be erected or inverted between the actuator A and the unsprung member W.

In the hydraulic damper D1, the spring 1 for biasing the hydraulic damper E1 in the damper compressing direction and the spring 2 for biasing the hydraulic damper E1 in the damper extending direction are accommodated within the pressure chambers respectively of the hydraulic damper E1.

That is, the springs 1 and 2 are interposed between the actuator A and the unsprung member W and in parallel with the hydraulic damper E1. More specifically, the piston P1 of the hydraulic damper E1 is held grippingly by the two springs 1 and 2.

In this state, the spring 1 biases the hydraulic damper E1 in the damper compressing direction and the spring 2 biases the hydraulic damper E1 in the damper extending direction.

The springs 1 and 2 not only functions to suppress the transfer of a high-frequency oscillation of the unsprung member W to the actuator A side, i.e., the sprung member B side, but also functions to move the piston back to its predetermined position with respect to the cylinder of the hydraulic damper E1.

Thus, the problems encountered in the conventional dampers such as deterioration of the ride comfort in the vehicle caused by interference of the piston P1 with the cylinder C1 and deterioration of the damper reliability are solved.

Moreover, in the damper D1, the hydraulic damper E1 is connected in series with the actuator A and is disposed on the unsprung member W side. Therefore, when a high-frequency oscillation, e.g., oscillation relatively large in acceleration, is inputted to the unsprung member W in the case where the vehicle runs on a bad road or strikes on a projection of a road surface, the hydraulic damper E1 absorbs this oscillation energy, and coupled with the oscillation transfer suppressing effect created by the springs 1 and 2, the hydraulic damper E1 functions to make the transfer of the oscillation to the actuator A difficult.

In this case, the actuator A converts the oscillation as a linear motion inputted from the unsprung member W side into a rotational motion. In this connection, there are provided many rotating members large in inertial mass and the moment of inertia becomes large against a high-frequency oscillation; besides, friction exerts an influence. Consequently, it becomes easier to transmit oscillation of the unsprung member W side to the sprung member B. However, as noted above, the hydraulic damper E1 absorbs the said oscillation and the springs 1 and 2 exhibit an oscillation transfer suppressing effect, whereby the transfer of the oscillation to the actuator A is suppressed. Thus, even in such a case, the damper D1 is advantageous in that the ride comfort on the vehicle is not deteriorated.

Further, since the direct action of a high-frequency oscillation on the actuator A is prevented by the hydraulic damper E1, the transfer of such a high-frequency oscillation particularly large in acceleration to the motor M is suppressed. Accordingly, the reliability of the actuator A as a main component of the damper D1 is improved and it is possible to solve the problems of the conventional dampers and improve the reliability of the damper D1.

According to the above construction, the working environment of the actuator A can be improved and hence it is possible to reduce the cost of the actuator A.

Besides, since the springs 1 and 2 are accommodated within the cylinder C1 of the hydraulic damper E1, the damper D1 can be slimmed and reduced in size as compared with the construction wherein spring bearing members and springs are provided for example on the outer periphery side of the hydraulic damper E1.

Moreover, since the springs 1 and 2 are accommodated within the cylinder C1 of the hydraulic damper E1, when coil springs are used as the springs 1 and 2, it is possible to reduce the diameter of the springs 1 and 2, so that even if the wire rod diameter is made small, it is possible to ensure the same spring constant in comparison with the case where the springs are disposed on the outer periphery side of the hydraulic damper E1. Consequently, it is possible to reduce the cost of the springs 1 and 2 and reduce the weight of the damper D1 by that much.

Further, since it is not necessary to adopt such a construction as disposing spring bearings and springs on the outer periphery side of the hydraulic damper E1 for example, it is possible to enlarge the outer periphery diameter of the hydraulic damper E1 by that much. In this case, it is possible to increase the amount of liquid present within the hydraulic damper 1 and hence possible to suppress a change in temperature of the liquid and prevent a change in damping force characteristics of the hydraulic damper E1.

Further, since there is adopted a construction wherein a linear motion of the actuator A is transmitted to the hydraulic damper E1, i.e., a construction wherein the motor M and the rotating members are connected to the sprung member B side, a large mass such as the mass of the motor M is not included in the mass supported by the springs 1 and 2.

Therefore, even when a high-frequency oscillation acts on the unsprung member W, the total mass borne by the springs 1 and 2 and oscillating between the sprung member B and the unsprung member W can be made smaller than in the conventional dampers wherein the motor itself is supported by springs. As a result, the oscillation of the unsprung member W becomes difficult to be transmitted to the sprung member B, whereby it becomes possible to further improve the ride comfort.

Further, as is apparent from the above description, since the motor M itself is not supported by the springs 1 and 2, the layout of wiring of the motor M, etc. is easy, and since a high-frequency oscillation is not inputted directly to the motor M itself, there is no fear of damage to the wiring. Therefore, the onboard-characteristic of damper D1 to the vehicle is improved and thus there accrues a practical advantage.

The damper D1 of the first embodiment has been described above conceptually. Next, a concrete construction of the damper D1 will be described below.

Figure 2:
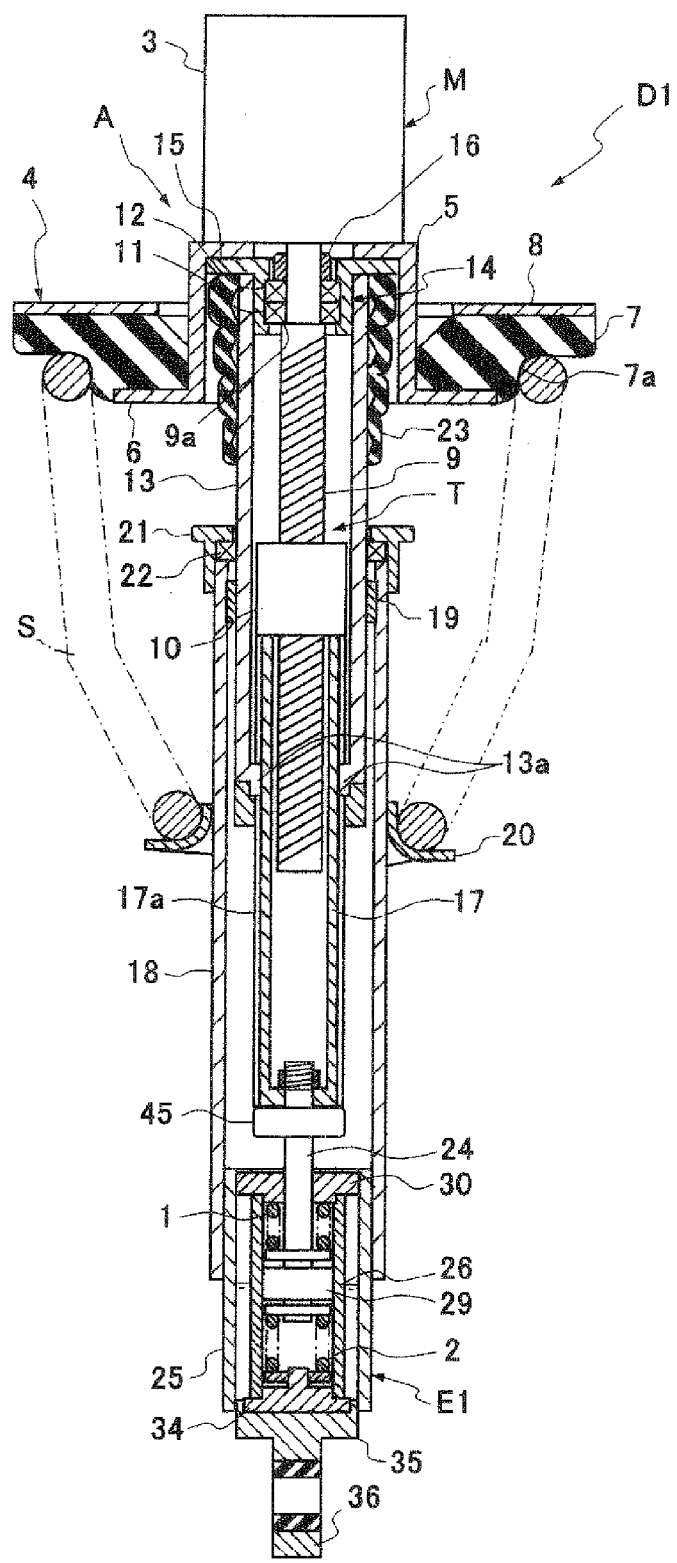
FIG. 2 is a longitudinal sectional view showing a concrete construction of the damper of the first embodiment.

As shown in FIG. 2, the damper D1 of the first embodiment according to a concrete construction is basically made up of a hydraulic damper E1 connected to an unsprung member (not shown), an actuator A connected in series with the hydraulic damper E1 and also connected to a sprung member (not shown), a spring 1 for biasing the hydraulic damper E1 in a damper compressing direction and a spring 2 for biasing the hydraulic damper E1 in a damper extending direction, the springs 1 and 2 being interposed between the actuator A and the unsprung member and in parallel with the hydraulic damper E1.

A detailed description will now be given. The actuator A includes a motor M and a motion converting mechanism T.

The motor M, though not specially shown, is made up of a case 3, a rotor, and a stator. The rotor is made up of a shaft and a magnet mounted on the outer periphery of the shaft and is supported by the case 3 rotatably through a ball bearing for example.

On the other hand, the stator is made up of a core (armature core) mounted on the inner periphery of the case 3 so as to confront the aforesaid magnet and a winding wound around the core. The motor M is constructed as a so-called brushless motor.

Though not shown, magnetic and optical sensors, e.g., Hall element and resolver, as rotor position detecting means are mounted on the motor M, whereby it is made possible to control a damping force or a control force for suppressing a relative movement between the vehicle body and the axle which force is generated by the damper D1 in accordance with the condition (e.g., rotational angle or angular velocity) of the rotational motion of the rotor.

Although a brushless motor is used as the motor M, as mentioned above, there may be used various other motors, e.g., DC and AC motors with brush and induction motor, insofar as the motor used is employable as an electromagnetic force generation source.

The motor M can be connected to a sprung member of a vehicle (not shown) through a mount 4. More specifically, the mount 4 includes a hat-like mount tube 5 having a flange 6 at a lower end thereof, annular oscillation isolating rubber 7 fused to an upper surface in the drawing of the flange 6, and an annular plate 8 fused to an upper end of the oscillation isolating rubber 7. The case 3 of the motor M is fixed to an upper end of the mount tube 5 and the plate 8 is fixed to the sprung member (not shown), whereby the motor M is connected to the sprung member.

The motion converting mechanism T is made up of a screw shaft 9 and a ball screw nut 10 as a screw nut.

The screw shaft 9 is supported rotatably by an inner tube 13 through ball bearings 11 and 12. More specifically, the ball bearings 11 and 12 are held by a cap member 14 which is fitted in an upper end in FIG. 2 of the inner tube 13. The cap member 14 has a flange 15 on its outer periphery side; the flange 15 being fixed with bolts (not shown) or the like to an upper base portion of the mount tube 5.

A stepped portion 9a is formed on an upper end side in the drawing of the screw shaft 9. The ball bearings 11 and 12 are held grippingly by the stepped portion 9a and a nut 16, whereby the oscillation of the screw shaft 9 with respect to the inner tube 13 is prevented.

The upper end in the drawing of the screw shaft 9 is inserted into a hole (not indicated) formed in an axial core portion of the upper base portion of the mount tube 5 and is connected to the rotor (not shown) of the motor M, whereby a rotational motion of the screw shaft 9 can be transmitted to the rotor of the motor M.

The ball screw nut 10 as a screw nut threadably engaged with the screw shaft 9 is connected unrotatably to an upper end in FIG. 2 of a connecting tube 17 that is smaller in diameter than the inner tube 13. The connecting tube 17 has a plurality of axial grooves 17a formed on the outer periphery side of the tube and lugs 13a formed on the inner periphery side of a lower end in the drawing of the inner tube 13 are inserted into the grooves 17a. With the grooves 17a and the lugs 13a, the connecting tube 17 is inhibited from rotation with respect to the inner tube 13.

That is, the ball screw nut 10 connected to the connecting tube 17 is swivel-stopped with respect to the inner tube 13.

The actuator A used in the damper D1 thus constructed concretely is made up of the motor M, screw shaft 9, inner tube 13, ball screw nut 10 and connecting tube 17, as described above, and is connected through the mount 4 to the sprung member (not shown).

As noted above, the inner tube 13 is connected to the mount tube 5 through the cap member 14 and the motor M is fixed to the mount tube 5. The screw shaft 9 rotates with rotation of the motor M, but since the ball screw nut 10 is swivel-stopped with respect to the inner tube 13, the ball screw nut 10 performs a linear motion vertically in the drawing.

Conversely, when the ball screw nut 10 performs a linear motion vertically in the drawing with respect to the screw shaft 9, the screw shaft 9 is rotated forcibly and so is the rotor of the motor M because the ball screw nut 10 is inhibited from a rotational motion by both connecting tube 17 and inner tube 13.

When the ball screw nut 10 performs a linear motion forcibly under the action of an external force thereon, as noted above, the rotor of the motor M is compelled to perform a rotational motion, so that an induced electromotive force is generated and regenerative current flows in the winding of the motor M, which in turn produces an electromagnetic force for suppressing the rotation of its rotor.

That is, by generating an induced electromotive force in the motor winding, energy is regenerated in the motor M to produce an electromagnetic force, so that torque induced by the electromagnetic force acts on the rotor of the motor M and suppresses the rotation of the rotor.

With the motion converting mechanism T, the torque which suppresses the rotation of the rotor acts as a force for suppressing the linear motion of the ball screw nut 10 and as a damping force in the damper D1.

Thus, upon operation of the motor M, the actuator A not only functions as an actuator for imparting a linear propelling force to the ball screw nut 10 but also functions to suppress the linear motion of the ball screw nut 10.

The mount 4 is not limited to the one described above, but may be of another construction. That is, there may be adopted other construction and shape insofar as they function as the mount.

The inner tube 13 is slidably inserted through a bearing 19 into an outer tube 18 which is disposed on the outer periphery side of the inner tube.

The outer tube 18 has a suspension spring bearing member 20 for supporting a lower end of a suspension spring S which bears the mass of the vehicular sprung member, the suspension spring bearing member 20 being mounted at a predetermined position of an intermediate outer periphery of the outer tube 18. As shown in FIG. 2, the suspension spring S is interposed between a recess 7a formed in a lower outer periphery portion of the oscillation isolating rubber 7 and the suspension spring bearing member 20.

In such a construction, even upon occurrence of excessive bumping in the vehicle, since an upper end of the suspension spring S is borne by the oscillation isolating rubber 7, oscillation transmitted to the sprung member side is absorbed softly and it is possible to improve the ride comfort in the vehicle.

Moreover, as noted earlier the annular bearing 19 is disposed on the inner periphery of an upper end of the outer tube 18 and hence axial oscillation of the inner tube 13 with respect to the outer tube 18 is prevented. Besides, a tubular stopper member 21 is fitted in an upper-end opening of the outer tube 18 and an annular dust seal 22 is disposed on the inner periphery side of the stopper member 21 to provide a seal a space between the outer periphery of the inner tube 13 and the outer tube 18, thereby preventing the entry of dust, rain water, etc. into the space formed by both inner and outer tubes 13, 18, i.e., into the damper D1. Consequently, the deterioration of quality is prevented with respect to such principal components of the damper DL as the screw shaft 9, ball screw nut 10 and motor M and the reliability of the damper D1 is improved.

Further, the screw shaft 9 and the ball screw nut 10 do not undergo interference such as a scattering stone from the exterior because they are accommodated within the inner and outer tubes 13, 18. In this point the reliability of the damper D1 is improved.

When the damper D1 contracts to an arbitrary length, an upper end of the stopper member 21 comes into abutment against a bellows-like tubular bump stopper 23 provided on the outer periphery side of the upper end in FIG. 2 of the inner tube 13, whereby a shock upon contraction of the damper D1 can be cushioned. At the same time, collision of a lower end of the screw shaft 9 against an upper end of a rod 24 of the hydraulic damper E1 to be described later, i.e., so-called bottom-out of the damper D1, is prevented and the vehicular ride comfort in the most-contracted state of the damper D1 is improved.

A lower-end opening of the outer tube 18 is connected, for example by press-fitting, onto the outer periphery of a reservoir tube 25 of the hydraulic damper E1 to be described later.

Figure 3:
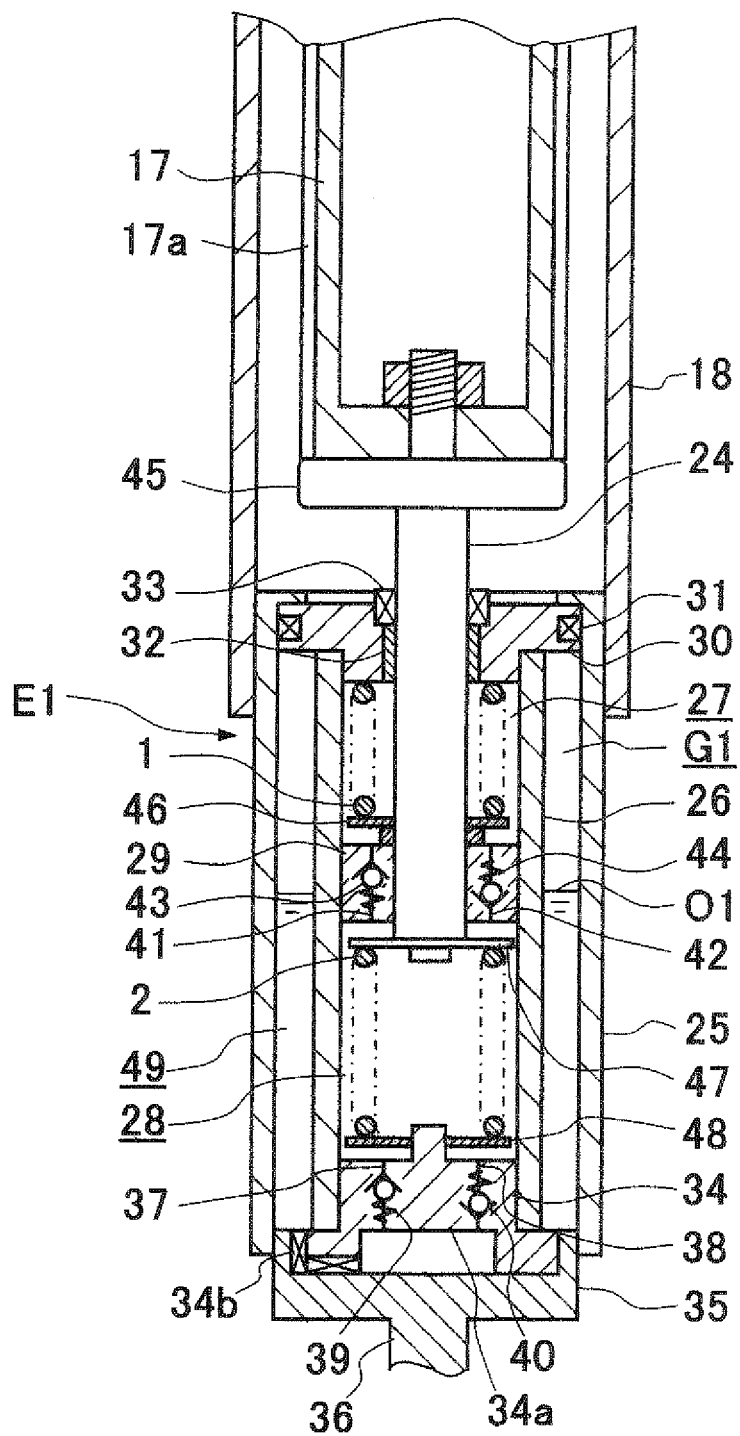
FIG. 3 is a partially enlarged, longitudinal sectional view of the damper of the first embodiment.

As shown in FIG. 3, the hydraulic damper E1 includes a cylinder 26, a piston 29 inserted slidably into the cylinder 26 and defining upper and lower (in the figure) pressure chambers 27, 28 within the cylinder 26, the rod 24 connected at one end thereof to the piston 29, and the reservoir tube 25 which covers the outer periphery side of the cylinder 26.

A more detailed description will now be given. A stepped portion (not indicated) formed in a lower portion of an annular head member 30 is fitted in an upper-end opening of the cylinder 26. The head member 30 is fitted inside the reservoir tube 25 and is fixed to the reservoir tube 25 by caulking an upper-end opening of the reservoir tube 25. With the head member 30, the cylinder 26 and the reservoir tube 25 are positioned concentrically.

The rod 24 is inserted along the inner periphery side of the head member 30 and the spacing between the head member 30 and the reservoir tube 25 is sealed with a sealing member 31 disposed on the outer periphery side of the head member 30. Further provided are a tubular rod guide 32 which is in sliding contact with the outer periphery of the rod 24 disposed on the inner periphery side of the head member 30 and a sealing member 33 which is in sliding contact with the outer periphery of the rod 24 to seal the space between the rod 24 and the head member 30. In this way the reservoir tube 25 and the cylinder 26 are sealed in a liquid-tight manner on their upper end side.

On the other hand, a disc-like valve body 34 with flange is fitted in a lower end of the cylinder 26 and a bottomed tubular bottom member 35 for sealing the reservoir tube 25 in a liquid-tight manner is fitted in along the inner periphery of a lower end of the reservoir tube 25.

The outer periphery side of the flange of the valve body 34 is put in abutment against the inner periphery of the bottom member 35 and in this state the valve body 34 is fitted in the lower end of the cylinder 26. Thus, the reservoir tube 25 and the cylinder 26 are positioned concentrically.

As described above, the outer periphery of an intermediate portion of the reservoir tube 25 is connected to the lower-end opening of the outer tube 18. The bottom member 35 is provided with an eye bracket 36 which permits connection of the damper D1 to the vehicular unsprung member. With the eye bracket 36 and the mount 4, the damper D1 is disposed in parallel with the suspension spring S and is interposed between the sprung member and the unsprung member.

The valve body 34 includes a concave portion 34a formed in the bottom thereof, passages 37 and 38 for communication between the concave portion 34a and the pressure chamber 28, damping force generating elements 39 and 40 disposed at suitable positions of the passages 37 and 38, respectively, and a cutout portion 34b for communication between the concave portion 34a and the outer periphery side of the flange.

The piston 29 includes passages 41 and 42 for communication between the pressure chambers 27 and 28 and damping force generating elements 43 and 44 disposed at suitable positions of the passages 41 and 42, respectively.

The upper end in the drawing of the rod 24 is connected to a lower end side of the connecting tube 17 and an annular cushion member 45 is provided near the upper end in the drawing of the rod 24. When the hydraulic damper E1 contracts to the maximum degree, the cushion member 45 comes into abutment against an upper end in the drawing of the head member 30 to inhibit movement of the rod 24 toward the cylinder 26 and at the same time prevent direct collision between the connecting tube 17 and the cylinder 26 and cushion a shock.

On the both sides of the piston 29 of the rod 24 there are disposed annular spring bearing members 46 and 47 which are rotatable with respect to the rod 24. Also on an upper end side of the valve body 34 is disposed a spring bearing member 48. The spring 1 is interposed between the spring bearing member 46 and the head member 30 and the spring 2 is interposed between the spring bearing members 47 and 48.

The spring I is accommodated within the pressure chamber 27 and biases the piston 29 downward in the drawing, i.e., in the direction in which the hydraulic damper E1 is compressed. On the other hand, the spring 2 is accommodated within the pressure chamber 28 and biases the piston 29 upward in the drawing, i.e., in the direction in which the hydraulic damper E1 is extended.

Thus, the piston 29 assumes a state in which it is biased in both upward and downward directions in the drawing by the springs 1 and 2. With the springs 1 and 2, the piston 29 is established its position axially with respect to the cylinder 29 and is maintained in its neutral position.

The mass borne resiliently by the springs 1 and 2 becomes equal to the total mass of the connecting tube 17, ball screw nut 10, and the rod 24 and piston 29 of the hydraulic damper E1, and is thus small in comparison with that in the conventional dampers.

The springs 1 and 2 are thus accommodated within the hydraulic damper E1 and this is very advantageous in that no influence is exerted on the overall length of the damper D1.

A description will now be given about the advantage of the rotatable mounting of the spring bearing members 46 and 47 on the rod 24. When the hydraulic damper E1 extends or contracts, the springs 1 and 2 also extends or contracts with that motion of the hydraulic damper. In this case, since the springs 1 and 2 have the characteristic of rotating in the circumferential direction when extending or contracting, the springs 1 and 2 tend to rotate in the circumferential direction with respect to the spring bearing members 46, 47, 48 and the head member 30.

Since the spring bearing members 46 and 47 are allowed to rotate with respect to the rod 24, they do not obstruct the rotation of the springs 1 and 2.

That is, the springs 1 and 2, at the time of extension or contraction thereof, rotate together with the spring bearing members 46 and 47 relative to the rod 24, spring bearing member 48 and head member 30 and so there is no fear that wire rod ends of the springs 1 and 2 may scratch the spring bearing surfaces of the spring bearing members 46, 47 and 48 for the springs 1 and 2 or the spring bearing surface of the head member 30 for the spring 1.

Thus, the spring bearing members 46, 47, 48 and the head member 30 are not damaged, so that the deterioration of those spring bearing members 46, 47, 48 and head member 30 can be prevented and hence the reliability of the damper D1 is improved.

Besides, the torque induced by rotation during extension or contraction of the springs 1 and 2 does not act on the rod 24, with no fear of causing the rod 24 to rotate in the circumferential direction. Thus, the occurrence of disconnection between the rod 24 and the connecting tube 17 is prevented.

Moreover, since the torque from the springs 1 and 2 does not act on the rod 24, a larger frictional force than necessary is not developed between the grooves 17a of the connecting tube 17 and the lugs 13a of the inner tube 13. Consequently, not only smooth extension and contraction of the damper D1 are not obstructed, but also it becomes possible to prevent deterioration of the connecting tube 17 and of the inner tube 13.

Thus, the rotation permitting means in the concretely-constructed damper D1 are the spring bearing members 46 and 47 themselves. By thus attaching the spring bearing members 46 and 47 themselves to the rod 24 rotatably, the circumferential rotation of the springs 1 and 2 can be allowed easily and at low cost. Although in the above description the rotation permitting means are the spring bearing members 46 and 47, a modification may be made such that the spring bearing members 48 is mounted on the valve body 34 rotatably, and an annular member such as a washer is interposed between the spring 1 and the spring bearing member 46 or the head member 30, an annular member such as a washer is interposed between the spring 2 and one of the spring bearing members 47 and 48, and the annular members and the springs 1, 2 are together rotated, thus serving as means for permitting circumferential rotation of the springs 1 and 2.

In the case where the connection between the lower-end opening of the outer tube 18 and the reservoir tube 25 of the hydraulic damper E1 is made by threaded engagement, the reservoir tube 25 can be axially moved forward and backward with respect to the outer tube 18 by rotating the reservoir tube 25 with respect to the outer tube 18. As a result, it becomes possible to effect so-called vehicle height adjustment. Even during the vehicle height adjustment, the spring bearing members 46 and 47 are made rotatable with respect to the rod 24 and hence there is no fear of disconnection between the rod 24 and the connecting tube 17. Besides, also during the vehicle height adjustment, it is possible to prevent deterioration of the spring bearing members 46, 47, 48 and the head member 30 and hence the connecting tube 17 and the inner tube 13.

When the connection between the lower-end opening of the outer tube 18 and the reservoir tube 25 of the hydraulic damper E1 is made by threaded engagement, it is preferable that a nut be brought into threaded engagement with the outer periphery of the reservoir tube 25 and be abutted against and clamped to the lower end of the opening of the outer tube 18, to prevent loosening of the reservoir tube 25 and the outer tube 18.

Turning back to the construction of the hydraulic damper E1, liquid such as hydraulic oil is filled into the pressure chambers 27 and 28 in the cylinder 26 of the hydraulic damper E1 and a predetermined amount of liquid is also filled into a gap 49 between the cylinder 26 and the reservoir tube 25. In this connection, within the gap 49 is formed a gas chamber G1 with a liquid level O1 as a boundary and the gap 49 functions as a reservoir.

Thus, the hydraulic damper E1 is formed as a so-called double tube type. Of course, the hydraulic damper E1 may be formed a single tube type. However, as described above, by forming the hydraulic damper E1 as a double tube type and disposing the reservoir on the outer periphery side of the cylinder, there accrues an advantage that the overall length of the hydraulic damper E1 can be shortened.

In the hydraulic damper E1, when the rod 24 moves downward in the drawing with respect to the cylinder 26, the piston 29 moves downward and expands the pressure chamber 27 and contracts the pressure chamber 28.

At this time, the liquid moves from the pressure chamber 28 into the pressure chamber 27 through the passage 42 and the damping force generating element 44. Further, the liquid in an amount corresponding to the rod intrusion volume into the cylinder 26, which liquid is surplus within the cylinder 26, flows through the passage 37 and the damping force generating element 39 into the gap 49 serving as a reservoir.

The hydraulic damper E1 generates a damping force matching a pressure loss which is produced when the liquid passes through the damping force generating elements 39 and 44.

Conversely, when the rod 24 moves upward in the drawing with respect to the cylinder 26, the piston 29 moves upward and expands the pressure chamber 28 and contracts the pressure chamber 27.

At this time, the liquid moves from the pressure chamber 27 into the pressure chamber 28 through the passage 41 and the damping force generating element 43. Further, the liquid in an amount corresponding to the volume of the rod 24 withdrawing from the interior of the cylinder 26, which amount corresponds to a deficient amount in the cylinder 26, flows out from the gap 49 serving as a reservoir, passes through the passage 38 and the damping force generating element 40 and enters the cylinder 26.

In this case, the hydraulic damper E1 generates a damping force matching a pressure loss which is produced when the liquid passes through the damping force generating elements 40 and 43.

As the damping force generating elements 38, 40, 43 and 44 there may be used, for example, orifices or leaf valves. Any other elements may be used insofar as they exhibit the predetermined damping action.

As noted above, since the connecting tube 17 of the actuator A is connected to the rod 24 of the hydraulic damper E1, the piston 29 connected to the rod 24 is put in sliding contact with the cylinder 26 which is connected to the outer tube 18 through the reservoir tube 25, thus functioning as a bearing to prevent axial oscillation on the lower end side of the connecting tube 17. Axial oscillation of the connecting tube 17 is prevented also by the lugs 13a of the inner tube 13 whose axial oscillation is prevented by the outer tube 17, with the result that axial oscillation of the screw shaft 9 relative to the ball screw nut 10 is prevented. Consequently, even when a lateral force is inputted to the damper D1, it is possible to prevent concentrated imposition of a load on a certain ball (not shown) of the ball screw nut 10 and hence possible to prevent deterioration of the ball or the spiral groove of the screw shaft 9.

Moreover, since the deterioration of the aforesaid ball or the spiral groove of the screw shaft 9 can be prevented, the rotational motion of the screw shaft 9 relative to the ball screw nut 10 and the moving motion of the damper D1 in its extending direction can be kept smooth, so that the function as the damper D1 is not impaired. Also in this point the reliability of the damper D1 is improved by adopting this construction.

Since the hydraulic damper E1 is formed as a double tube type, the overall length of the damper D1 can be shortened. Besides, since the springs 1 and 2 are accommodated within the hydraulic damper E1, as described above, there is no influence of the springs 1 and 2 on the overall length of the damper D1. Therefore, coupled with the hydraulic damper E1 of the double tube type, it becomes possible to minimize the overall length of the damper D1, whereby even in the damper D1 with the hydraulic damper E1 connected in series with actuator A, not only it becomes easy to ensure a stroke but also the onboard-characteristic of the damper to the vehicle is improved.

Further, since the springs 1 and 2 are accommodated within the cylinder 26 of the hydraulic damper E1, the damper D1 can be slimmed and reduced in size and the springs 1 and 2 can be reduced in diameter. As a result, it is not only possible to reduce the cost of the springs 1 and 2 but also possible to reduce the weight of the damper D1.

Further, since it is not necessary to adopt such a construction as spring bearing member and springs being disposed on for example the outer periphery side of the hydraulic damper E1, the outer periphery diameter of the hydraulic damper E1 can be made larger by that much. In this case, it is possible to increase the amount of liquid present in the hydraulic damper D1 and hence possible to suppress a change in temperature of the liquid and prevent a change in damping force characteristics of the hydraulic damper E1. Besides, since it is possible to increase the outer periphery diameter of the hydraulic damper E1, it is also possible to enlarge the pressure receiving area in the hydraulic damper E1, which is advantageous to the generation of a damping force.

Moreover, since the springs 1 and 2 are accommodated within the hydraulic damper E1, when assembling the damper D1, the actuator A side and the hydraulic damper E1 side can each be made an assembly.

More particularly, the actuator A is an electric device including the motor M, while the hydraulic damper E1 is a hydraulic device, so that the respective production lines may be different. However, since each can be made an assembly, even if both are fabricated in different factories, the damper D as the final product can be manufactured by merely combining the two. This is advantageous and the mounting work becomes easier.

In the damper D1 constructed as above, when the vehicular sprung member and unsprung member undergo a force from a road surface and perform a linear relative motion, the ball screw nut 10 connected to the axle side and the screw shaft 9 connected to the sprung member side perform a linear relative motion. This relative motion is converted to a rotational motion of the screw shaft 9 as described above and the rotational motion is transmitted to the rotor of the motor M.

Upon the rotation motion of the rotor of the motor M, the winding in the motor M crosses the magnetic field of the magnet and an induced electromotive force is generated in the winding. Consequently, energy is regenerated in the motor M and an electromagnetic force is generated, and rotational torque based on the electromagnetic force developed by the induced electromotive force acts on the rotor of the motor M and suppresses the rotational motion of the rotor.

This rotor rotation suppressing action acts to suppress the rotational motion of the screw shaft 9, so that the linear motion of the ball screw nut 10 is suppressed. On the basis of the aforesaid electromotive force, the damper D1 generates a control force acting as a damping force to absorb and cushion the oscillation energy.

In the case where an electric current is supplied positively to the winding from an external power supply the extension and contraction of the damper D1 can be controlled freely, i.e., freely in the range permitting generation of a control force for the damper D1, by adjusting the rotational torque acting on the rotor. Therefore, the damping characteristics of the damper D1 can be made changeable and the damper D1 can be allowed to function as an actuator. Further, in case of allowing the damper D1 to function as an actuator in accordance with the damping force based on energy regeneration and performing an appropriate control, it is also possible to let the damper D1 function as an active suspension.

If it is not necessary to let the damper D1 function positively as an actuator as in the above description, that is, if it suffices to only generate the damping force, it is unnecessary to connect the motor M to the external power supply. In this case, the linear relative motion between the screw shaft 9 and the ball screw nut 10 may be suppressed by rotational torque induced by an electromagnetic force which is developed by an induced electromotive force generated in the winding upon forced rotation of the rotor of the motor M, i.e., by only energy regeneration.

In the damper D1, since the hydraulic damper E1 is disposed on the unsprung member side, even in the event a high-frequency oscillation is inputted from a road surface and cannot be absorbed by the actuator A as described above, the high-frequency oscillation is absorbed by the hydraulic damper E1 and the transfer of the oscillation to the sprung member side by the springs 1 and 2 can be suppressed.

Thus, also in the damper D1 constructed concretely as above, for example even when a high-frequency oscillation such as oscillation relatively large in acceleration is inputted to the unsprung member in the case where the vehicle runs on a bad road or strikes on a projection of a road surface, there is attained an effect such that the vehicular ride comfort is not impaired.

Further, with the spring bearing members 46 and 47 serving as rotation permitting means, the torque of the springs 1 and 2 is not transmitted to the connecting tube 17 and a frictional force developed between the grooves 17*a* of the connecting tube 17 and the lugs 13*a* of the inner tube 13 can be suppressed, not obstructing a smooth extending/contracting motion of the actuator A. Thus, the absorption and suppression of oscillation are performed smoothly, whereby the vehicular ride comfort can be improved positively.

A brief description will now be given about the damping force based on the moment of inertia. The damping force developed on the actuator A side of the damper D1 is approximately the sum of the force acting axially of the damper D1, which force is induced by the moment of inertia of the screw shaft 9, that of the rotor of the motor M and that of the ball screw nut 10, and an electromagnetic force generated by the motor M. Particularly, the force induced by the moment of inertia of the rotating system becomes large in proportion to the acceleration of the extending/contracting motion of the damper D1 because the angular acceleration of the rotor of the motor M is proportional to the acceleration of the extending/contracting motion of the damper D1. However, the moment of inertia of the rotor and that of the screw shaft 9 are relatively large and the influence thereof on the damping force is unignorable.

Since the force based on the moment of inertia of the rotor and that of the screw shaft 9 is proportional to the acceleration of the extending/contracting motion as described above, it acts in a direction opposed to the axial force of the damper D1 which force is inputted to the damper D1 from a road surface for example. As a result, the damper D1 generates a damping force not dependent on the electromagnetic force of the motor M. Particularly, upon input of an abrupt axial force, the damper D1 produces a higher damping force, with the result that an occupant in the vehicle will have a rugged feeling.

Thus, the damping force based on the moment of inertia of the rotor and that of the screw shaft 9 is generated always in advance of the damping force dependent on the electromagnetic force. Besides, the damping force induced by the moment of inertia of the rotor and that of the screw shaft 9, which force depends on the acceleration of the extending/contracting motion of the damper D1, is difficult to be controlled, so that the smaller the moment of inertia of the rotor and that of the screw shaft 9, the greater the degree of suppression for the influence of the moment of inertia of the rotor and that of the screw shaft 9 on the damping force. However, as noted above, the force acting in the axial direction of the damper D1 on the basis of the moment of inertia of the rotor and that of the screw shaft 9 is absorbed by the hydraulic damper E1 and the springs 1, 2 and the transfer of oscillation large in acceleration to the sprung member is suppressed, whereby the vehicular ride comfort is improved.

Further, even when a high-frequency oscillation acts on the unsprung member, since the large mass of the motor M and that of the screw shaft 9 are not included in the mass supported by the springs 1 and 2 and the mass supported by the springs 1 and 2 is light in comparison with that in the conventional dampers, the force for transmitting the input of oscillation in the upsprung member to the sprung member is also small as a result of the above reduction of mass and hence it is possible to improve the ride comfort in the vehicle.

Moreover, the natural frequency also becomes high as a result of reduction of the mass borne by the springs 1 and 2, so that there is no fear of resonance with the frequency in the range in which the occupant in the vehicle has a bad feeling as to ride comfort. Also in this point it is possible to improve the ride comfort in the vehicle.

Further, since the hydraulic damper E1 is disposed on the unsprung side, the mounting space for the hydraulic damper E1 need not be ensured inside the vehicle body. That is, the motor M can be fixed inside the vehicle body. Consequently, the length of a relative motion area of the damper D1 becomes equal to the overall length of the damper D1 minus the length of the motor M and hence it becomes easy to ensure the stroke of the damper D1. That is, in comparison with the case where the motor M is attached to the underside, i.e., outside, of the vehicle body, the stroke can be taken longer by an amount corresponding to the length of the motor M.

Besides, since the motor M can be disposed inside the vehicle body, electric wires (not shown) which will be extended from electrodes of the motor M can be laid inside the vehicle body and it becomes easier to connect the electric wires to external controller and control circuit. Since the electric wires in question are accommodated within the vehicle body, it becomes possible to lessen the chance of deterioration of the electric wires.

Moreover, since the motor M is fixed specially inside the vehicle body, the damper D1 can be mounted on the vehicle without changing its vehicle body-side mounting position.

Consequently, the vehicle body-side mounting position can be standardized and hence it is possible to reduce the cost. Besides, since a shocking load in full bounding is transmitted to the vehicle body through the aforesaid mounting portion, there also accrues an advantage that it is possible to prevent a large force from acting on the motor M.

Further, also in the concretely-constructed damper D1, the hydraulic damper E1 can be disposed in an inverted state on condition that the rod 24 is connected to the outer tube 18 and the cylinder 26 connected to the connecting tube 17.

Figure 4:
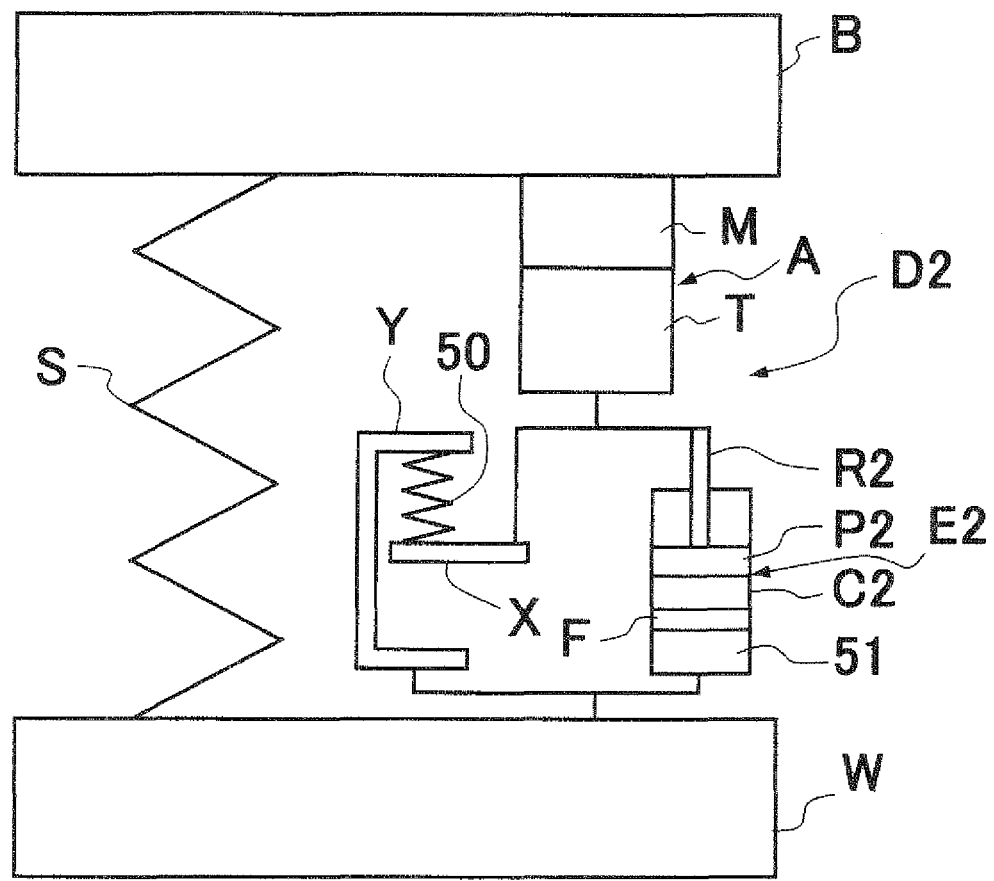
FIG. 4 is a conceptual diagram of a damper according to a second embodiment of the present invention.

As shown in FIG. 4, a damper D2 according to a second embodiment of the present invention is interposed between an unsprung member W and a sprung member B and in parallel with a suspension spring S. Basically, the damper D2 is made up of a hydraulic damper E2 connected to the unsprung member W, an actuator A connected in series with the hydraulic damper E2 and also connected to the sprung member B, a spring 50 and air spring 51 both interposed between the actuator A and the unsprung member W and in parallel with the hydraulic damper E2, the spring 50 biasing the hydraulic damper E2 in a damper compressing direction and the air spring 51 biasing the hydraulic damper ES in a damper extending direction, a spring bearing member X, and a spring bearing portion Y.

An actuator A, a motion converting mechanism T and a motor M are the same as those used in the damper D1 of the above first embodiment. The actuator A causes the motor M to generate torque positively and thereby can impart thrust to the linear motion-side member in the motion converting mechanism T. When the linear motion-side member in the motion converting mechanism T is compelled to make a motion with an external force, the motion can be suppressed with regenerated torque produced by the motor M.

In the damper D2, a relative movement between the sprung member B and the unsprung member W can be suppressed with the thrust and torque generated by the actuator A and at the same time the attitude of the sprung member B, more particularly the vehicle body, can be controlled making the most of the function as the actuator. Consequently, the function as an active suspension can also be exhibited.

The hydraulic damper E2, although a concrete construction thereof will be described later, includes a cylinder C2, a piston P2 inserted slidably into the cylinder C2 and defining two pressure chambers in the cylinder C2, and a rod R2 connected at one end thereof to the piston P2. The hydraulic damper E2 generates a predetermined damping force upon extension or contraction thereof.

The hydraulic damper E2 is provided with a gas chamber which compensates for liquid in an amount corresponding to an intruding volume of the rod R2 into the cylinder C2 or a withdrawing volume of the rod R2 from the interior of the cylinder C2. The gas chamber is partitioned by a free piston F inserted slidably into the cylinder C2.

In the damper D2, mainly for the purpose of absorbing a high-frequency oscillation, the hydraulic damper E2 is interposed between the actuator A and the unsprung member W. More particularly, one end of the hydraulic damper E2 is connected to the linear motion-side member of the actuator A and an opposite end thereof is connected to the unsprung member W.

In connecting the hydraulic damper E2 and the actuator A with each other, one of the cylinder C2 and the rod R2 in the hydraulic damper E2 is connected to the linear motion-side member of the actuator A, while the other is connected to the unsprung member W.

Thus, it is optional whether the hydraulic damper E2 is to be interposed in an erected state or in an inverted state between the actuator A and the unsprung member W.

In the damper D2 there are provided the spring bearing portion Y which is stationary with respect to the other of the cylinder C2 and the rod R2 in the hydraulic damper E2, the spring bearing member X which is stationary with respect to one of the cylinder C2 and the rod R2 in the hydraulic damper E2, and the spring 50 interposed between the spring bearing member X and the spring bearing portion Y and biasing the hydraulic damper E2 in the damper compressing direction. Further, the air spring 51 which biases the hydraulic damper E2 in the damper extending direction is constituted by the gas chamber in the hydraulic damper E2.

That is, the spring 50 and the air spring 51 are interposed between the actuator A and the unsprung member W and in parallel with the hydraulic damper E2. With spring 50 and the air spring 51, the piston P2 of the hydraulic damper E2 is supported resiliently from both upper and lower sides.

The spring 50 and the air spring 51 not only function to suppress the transfer of a high-frequency oscillation of particularly the unsprung member W to the actuator A side, i.e., the sprung B side, but also function to bring back the piston to its predetermined position with respect to the cylinder of the hydraulic damper E2.

That is, the problems of the conventional dampers such as deterioration of the vehicular ride comfort as a result of interference of the piston P2 with the cylinder C2 and deterioration of the damper reliability are solved.

Moreover, the volume of the gas chamber formed in the hydraulic damper E2 decreases upon compression of the hydraulic damper E2 and increases upon extension of the hydraulic damper E2, so that by using the gas chamber as it is the air spring 51, the cost can be reduced without the need of forming the air spring in the damper D2.

In case of utilizing the gas chamber in the hydraulic damper E2 as the air spring 51, if a reservoir is provided on the outer periphery side of the cylinder C2 and a gas chamber is formed within the said reservoir and used as the air spring 51, the axial length of the hydraulic damper E2 can be made short in comparison with a single tube type damper, thus making it possible to shorten the overall length of the damper D2.

The air spring 51 may be provided separately from the gas chamber formed in the hydraulic damper E2, but in this case, the above advantage is lost.

The spacing between the spring bearing portion Y and the spring bearing member X with the spring 50 interposed therein makes it possible to apply an initial load to the spring 50 and the air spring 51, whereby the reaction force of both spring 50 and air spring 51 against the amount of movement of the rod R2 relative to the cylinder C2 can be increased as compared with the construction wherein the cylinder C2 and the rod R2 are connected together through a single spring. Consequently, not only the effect of moving back the piston P2 to its predetermined position can be enhanced, but also the piston position relative to the cylinder C2 can also be adjusted by adjusting the spacing between the spring bearing portion Y and the spring bearing member X without replacement of the spring 50 and the air spring 51. Besides, since it is possible to adjust the initial load without replacement of the spring 50 and the air spring 51, the characteristics of the damper D2 can also be optimized to match each individual vehicle.

Also in the damper D2, the hydraulic damper E2 is connected in series with the actuator A and is disposed on the unsprung member W side. Therefore, when a high-frequency oscillation such as, for example, oscillation relatively large in acceleration is inputted to the unsprung member W in the case where the vehicle runs on a bad road or strikes on a projection of a road surface, the hydraulic damper E2 absorbs energy of the oscillation, and coupled with the above oscillation transfer suppressing effect attained by the spring 50 and the air spring 51, the hydraulic damper E2 functions to make the transfer of the oscillation to the actuator A difficult.

As noted earlier, the actuator A has the characteristic of facilitating the transfer of oscillation from the unsprung member W side to the sprung member B, but since the hydraulic damper E2 absorbs the oscillation and the spring 50 and the air spring 51 exhibit the oscillation transfer suppressing effect, the transfer of the oscillation to the actuator A is suppressed. Consequently, also in the damper D2 of this second embodiment, there is no fear of deterioration of the vehicular ride comfort.

Besides, since the air spring 51 is used as one of the two spring elements, it is possible to reduce the weight of the damper D2, and in the case where the gas chamber in the hydraulic damper D2 is used as the air spring 51, it becomes unnecessary to provide an air spring mounting space separately and it is possible to reduce the size of the damper D2.

Moreover, as described above, since direct action of a high-frequency oscillation on the actuator A is prevented by the hydraulic damper E2, the transfer of a high-frequency oscillation particularly large in acceleration to the motor M is suppressed. As a result, the reliability of the actuator A as a main component of the damper D2 is improved and it is possible to solve the problems of the conventional dampers and improve the reliability of the damper D2.

Further, according to the above construction it is possible to improve the working environment of the actuator A and hence possible to reduce the cost of the actuator A.

Moreover, in the above construction, since a linear motion of the actuator A is transmitted to the hydraulic damper E2, that is, the motor M and the foregoing rotating members are connected to the sprung member B side, a large mass such as the mass of the motor M is not included in the mass borne by the spring 50 and the air spring 51. Therefore, even if a high-frequency oscillation acts on the unsprung member W, the total mass supported by the spring 50 and the air spring 51 and oscillates between the sprung member B and the unsprung member W can be made lighter than in the conventional dampers wherein the motor M itself is supported by springs. As a result, oscillation of the unsprung member W becomes difficult to be transmitted to the sprung member B, whereby it becomes possible to further improve the ride comfort.

Further, as is seen from the above description, since the motor M itself is not supported by the spring 50 and the air spring 51, the layout of, for example, wiring of the motor M is easy. Besides, since a high-frequency oscillation is not directly inputted to the motor M, there is no fear of damage of the wiring. Consequently, the onboard-characteristic of the damper D2 to the vehicle is improved, which is more practical.

The damper D2 of this second embodiment has been described above conceptually. A description will be given below about a more concrete construction of the damper D2.

Figure 5:
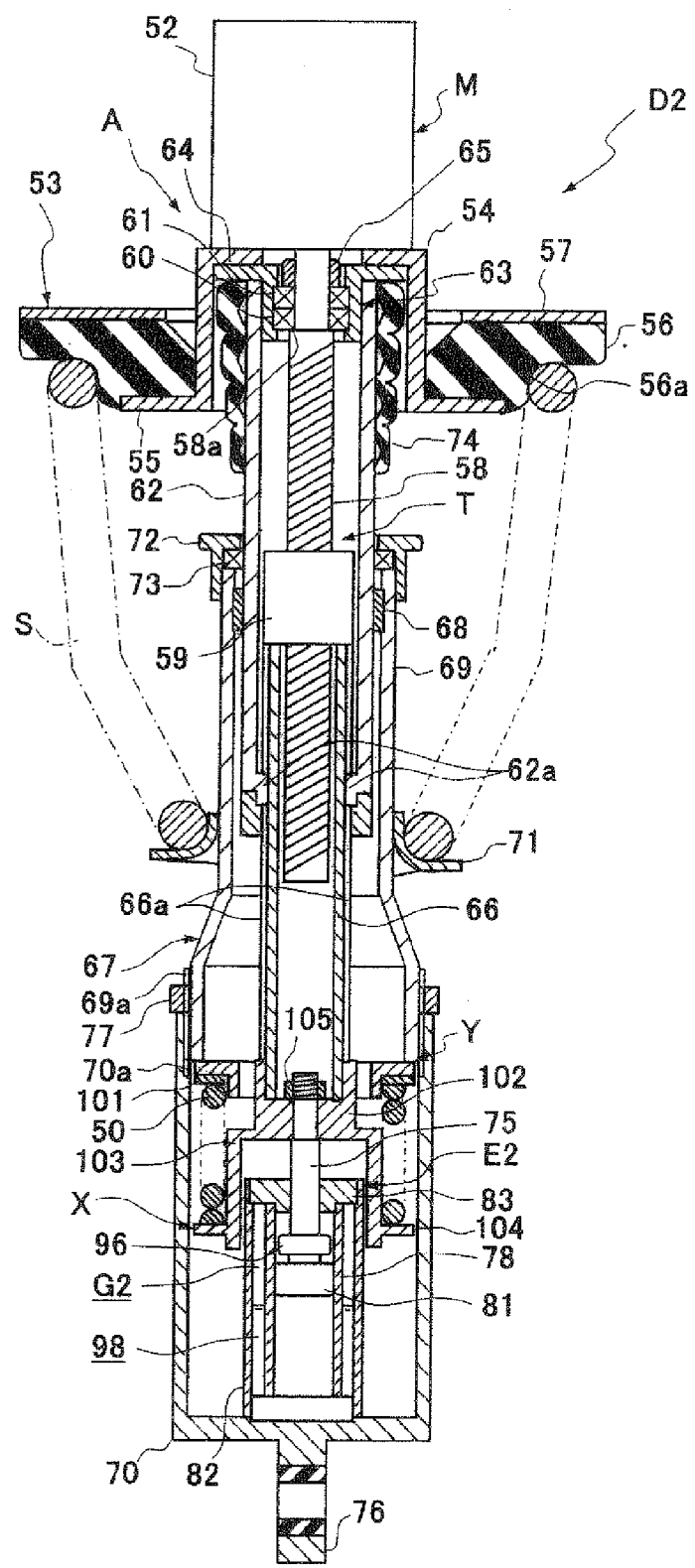
FIG. 5 is a longitudinal sectional view showing a concrete construction of the damper of the second embodiment.

As shown in FIG. 5, the damper D2 of a concrete construction is basically made up of a hydraulic damper E2 connected to an unsprung member (not shown), an actuator A connected in series with the hydraulic damper E2 and also connected to a sprung member side (not shown), a spring 50 and a gas chamber G2 as an air spring in the hydraulic damper E2 both interposed between the actuator A and the unsprung member and in parallel with the hydraulic damper E2, a spring bearing member X and a spring bearing portion Y.

A detailed description will now be given. The actuator A is provided with a motor M and a motion converting mechanism T. The motor M, though not specially shown, is made up of a case 52, a rotor, and a stator. The rotor is made up of a shaft and a magnet mounted on the outer periphery of the shaft and is supported by the case 52 rotatably through a ball bearing or the like.

On the other hand, the stator is made up a core (armature core) mounted on the inner periphery of the case 52 so as to confront the aforesaid magnet and a winding wound round the core. The motor M is constructed as a so-called brushless motor.

Though not shown, magnetic and optical sensors, e.g., Hall element and resolver, as rotor position detecting means are mounted on the motor M, whereby it is made possible to control a damping force or a control force for suppressing a relative movement between the vehicle body and the axle which force is generated by the damper D2 in accordance with the condition (e.g., rotational angle or angular velocity) of the rotational motion of the rotor.

The motor M can be connected to a sprung member of a vehicle (not shown) through a mount 53. More specifically, the mount 53 includes a hat-like mount tube 54 having a flange 55 at a lower end thereof, annular oscillation isolating rubber 56 fused to an upper surface in the drawing of the flange 55, and an annular plate 57 fused to an upper end of the oscillation isolating rubber 56. The case 52 of the motor M is fixed to an upper end of the mount tube 54 and the plate 57 is fixed to the sprung member (not shown), whereby the motor M is connected to the sprung member.

The motion converting mechanism T is made up of a screw shaft 58 and a ball screw nut 59 as a screw nut.

The screw shaft 58 is supported rotatably by an inner tube 62 through ball bearings 60 and 61. More specifically, the ball bearings 60 and 61 are held by a cap member 63 which is fitted in an upper end in FIG. 5 of the inner tube 62. The cap member 63 has a flange 64 on its outer periphery side, the flange 64 being fixed with bolts (not shown) or the like to an upper base portion of the mount tube 54.

A stepped portion 58a is formed on an upper end side in the drawing of the screw shaft 58. The ball bearings 60 and 61 are held grippingly by the stepped portion 58a and a nut 65, whereby axial oscillation of the screw shaft 58 with respect to the inner tube 62 is prevented.

The upper end in the drawing of the screw shaft 58 is inserted into a hole (not indicated) formed in an axial core position of the upper base portion of the mount tube 54 and is connected to the rotor (not shown) of the motor M, whereby a rotational motion of the screw shaft 58 can be transmitted to the rotor of the motor M.

The ball screw nut 59 as a screw nut threadably mounted on the screw shaft 58 is connected unrotatably to an upper end in FIG. 5 of a connecting tube 66 that is smaller in diameter than the inner tube 62. The connecting tube 66 has a plurality of axial grooves 66a formed on the outer periphery side of the tube and lugs 62a formed on the inner periphery side of a lower end in the drawing of the inner tube 62 are inserted into the grooves 66a. With the grooves 66a and the lugs 62a, the connecting tube 66 is inhibited from rotation with respect to the inner tube 62.

That is, the ball screw nut 59 connected to the connecting tube 66 is swivel-stopped with respect to the inner tube 62.

The actuator A used in the damper D2 thus constructed concretely is made up of the motor M, screw shaft 58, inner tube 62, ball screw nut 59 and connecting tube 66, as described above, and is connected through the mount 53 to the sprung member (not shown).

As noted above, the inner tube 62 is connected to the mount tube 54 through the cap member 63 and the motor M is fixed to the mount tube 54. The screw shaft 58 rotates with rotation of the motor M, but since the ball screw nut 59 is swivel-stopped with respect to the inner tube 62, the ball screw nut 59 performs a linear motion vertically in the drawing.

Conversely, when the ball screw nut 59 performs a linear motion vertically in the drawing with respect to the screw shaft 58, the screw shaft 58 is rotated forcibly and so is the rotor of the motor M because the ball screw nut 59 is inhibited from a rotational motion by the connecting tube 66 and inner tube 62.

When the ball screw nut 59 performs a linear motion forcibly under the action of an external force thereon, as noted above, the rotor of the motor M is compelled to perform a rotational motion, so that an induced electromotive force is generated and regenerative current flows in the winding of the motor M, which in turn produces an electromagnetic force for suppressing the rotation of its rotor.

That is, by generating an induced electromagnetic force in the motor winding, energy is regenerated in the motor M to produce an electromagnetic force, so that torque induced by the electromagnetic force acts on the rotor of the motor M and suppresses the rotation of the rotor.

With the motion converting mechanism T, the torque which suppresses the rotation of the rotor acts as a force for suppressing the linear motion of the ball screw nut 59 and as a damping force in the damper D2.

Thus, upon operation of the motor M, the actuator A not only functions as an actuator for imparting a linear propelling force to the ball screw nut 59 but also functions to suppress the linear motion of the ball screw nut 59.

The mount 53 is not limited to the one described above, but may be of another construction. That is, there may be adopted other construction and shape insofar as they function as the mount.

The inner tube 62 is slidably inserted through a bearing 68 into an outer tube 67 that is disposed on the outer periphery side of the inner tube.

The outer tube 67 includes a first tube 69 which covers the inner tube 62 and a bottomed cylindrical second tube 70 connected by threaded engagement with the first tube 69 so as to cover a lower end portion in the drawing which is one end portion of the first tube 69.

The outer tube 67 further includes a suspension spring bearing member 71 for supporting a lower end of a suspension spring S that bears the mass of the vehicular sprung member, the suspension spring bearing member 71 being mounted at a predetermined position of an intermediate outer periphery portion of the first tube 69. As shown in FIG. 5, the suspension spring S is interposed between a recess 56a formed in a lower outer periphery portion of the oscillation isolating rubber 56 and the suspension bearing member 71.

In such a construction, even upon occurrence of excessive bumping in the vehicle, since an upper end of the suspension spring S is borne by the oscillation isolating rubber 56, oscillation transmitted to the sprung member side is absorbed softly and it is possible to improve the ride comfort in the vehicle.

Moreover, as noted earlier, the annular bearing 68 is disposed on the inner periphery of an upper end of the first tube 69 and hence axial oscillation of the inner tube 62 with respect to the outer tuber 67 is prevented. Besides, a tubular stopper member 72 is fitted in an upper-end opening of the first tube 69 and an annular dust seal 73 is disposed on the inner periphery side of the stopper member 72 to seal a space between the outer periphery of the inner tube 62 and the outer tube 67, thereby preventing the entry of dust, rain water, etc. into the space formed between the inner tube 62 and the outer tube 67, i.e., into the damper D2. Consequently, the deterioration of quality is prevented with respect to such principal components of the damper D2 as the screw shaft 58, ball screw nut 59 and motor M and the reliability of the damper D2 is improved.

Further, the screw shaft 58 and the ball screw nut 59 do not undergo interference such as a scattering stone from the exterior because they are accommodated within the inner and outer tubes 62, 67. In this point the reliability of the damper D2 is improved.

When the damper D2 contracts to an arbitrary length, an upper end of the stopper member 72 comes into abutment against a bellows-like tubular bump stopper 74 provided on the outer periphery side of the upper end in FIG. 5 of the inner tube 62, whereby a shock upon contraction of the damper D2 can be cushioned. At the same time, collision of a lower end of the screw shaft 58 against an upper end of a rod 75 of the hydraulic damper E2 to be described later, i.e., so-called bottom-out of the damper D2, is prevented and the vehicular ride comfort in the most-contracted state of the damper D2 is improved.

The lower side of the first tube 69 is slightly expanded in diameter for the convenience of drawing. Such an expansion in diameter is not always needed, but the illustrate expansion in diameter is convenient for ensuring a space for accommodating within the second tube 70 the hydraulic damper E2, spring 50, spring bearing portion Y and spring bearing member X to be described later.

A lower end of the second tube 70 is provided with an eye bracket 76 which can connect the damper D2 to the vehicular unsprung member. With the eye bracket 76 and the mount 53, the damper D2 is interposed between the sprung member and the unsprung member and in parallel with the suspension spring S.

When connecting the first and second tubes 69, 70 with each other, a screw portion 69a formed on the outer periphery side of the lower end of the first tube 69 and a screw portion 70a formed on the inner periphery side of the second tube 70 are engaged with each other threadedly and both first and second tubes 69, 70 are inhibited from rotation a lock nut 77.

Figure 6:
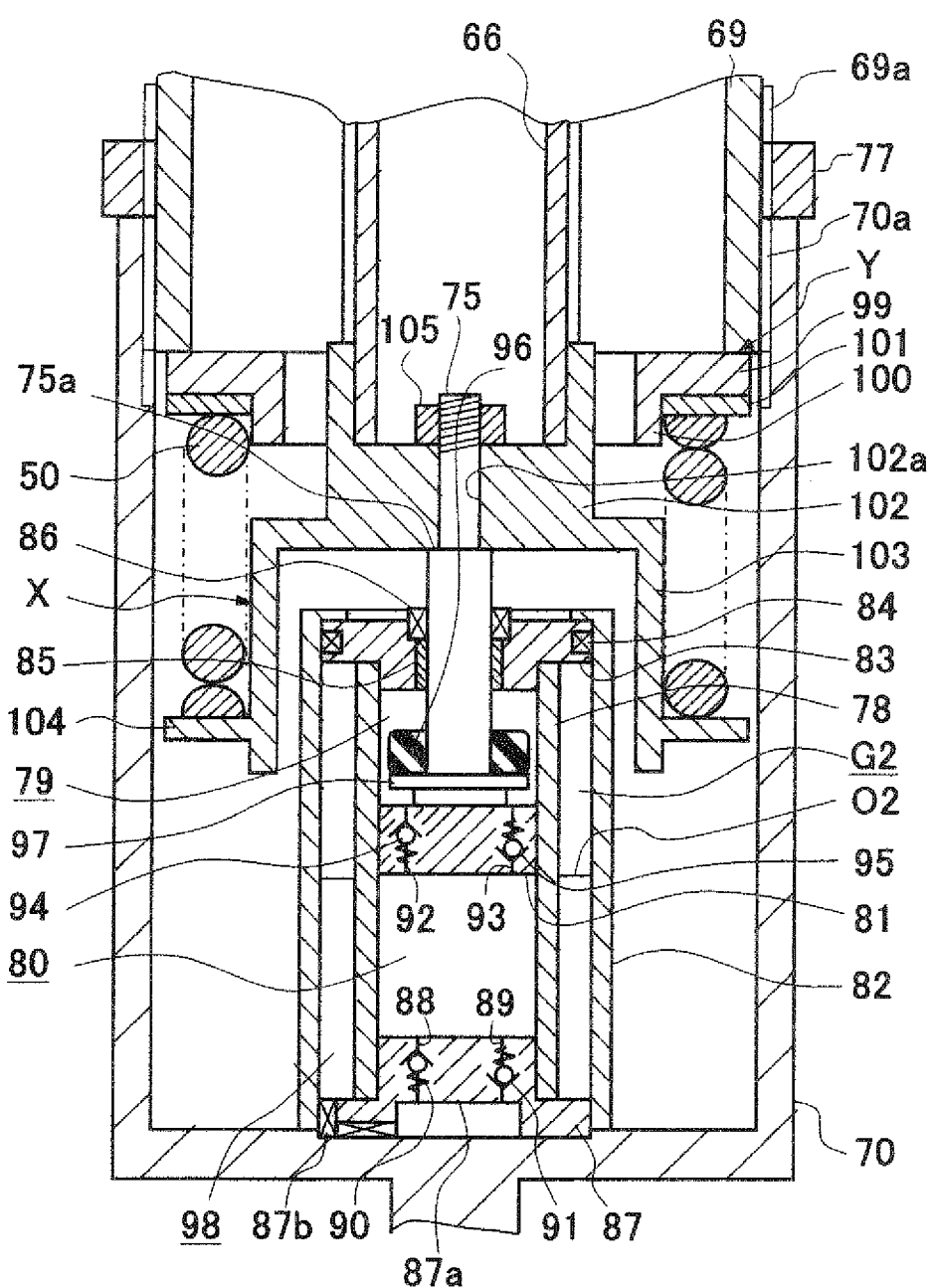
FIG. 6 is a partially enlarged, longitudinal sectional view of the damper of the second embodiment.

As shown in FIG. 6, the hydraulic damper E2 includes a cylinder 78, a piston 81 inserted slidably into the cylinder 78 and defining upper and lower (in the figure) pressure chambers 79, 80 within the cylinder 78, the rod 75 connected at one end thereof to the piston 81, and a reservoir tube 82 which covers the outer periphery side of the cylinder 78.

A more detailed description will now be given. A stepped portion (not indicated) formed in a lower portion of an annular head member 83 is fitted in an upper-end opening of the cylinder 78. The head member 83 is fitted inside the reservoir tube 82 and is fixed to the reservoir tube 82 by caulking an upper-end opening of the reservoir tube 82. With the head member 83, the cylinder 78 and the reservoir tube 82 are positioned concentrically.

The rod 75 is inserted along the inner periphery side of the head member 83 and the spacing between the head member 83 and the reservoir tube 82 is sealed with a sealing member 84 disposed on the outer periphery side of the head member 83. Further provided are a tubular rod guide 85 which is in sliding contact with the outer periphery of the rod 75 disposed on the inner periphery side of the head member 83 and a sealing member 86 which is in sliding contact with the outer periphery of the rod 75 to seal a space between the rod 75 and the head member 83. In this way the reservoir tube 82 and the cylinder 78 are sealed in a liquid-tight manner on their upper end side.

On the other hand, a lower end of the reservoir tube 82 is connected to the bottom of the bottomed cylindrical second tube 70 that constitutes a part of the outer tube 67, and a flanged disc-like valve body 87 is fitted in a lower end of the cylinder 78.

The outer periphery side of the flange of the valve body 87 is abutted against the inner periphery of the reservoir tube 82 and in this state the valve body 87 is fitted in the lower end of the cylinder 78, thus positioning the reservoir tube 82 and the cylinder 78 concentrically with each other.

The valve body 87 includes a concave portion 87a formed in the bottom of the valve body, passages 88 and 89 for communication between the concave portion 87a and the pressure chamber 80, damping force generating elements 90 and 91 disposed at suitable positions of the passages 88 and 89, respectively, and a cutout portion 87b for communication between the concave portion 87a and the outer periphery side of the flange.

The piston 81 includes passages 92 and 93 for communication between the pressure chambers 79 and 80 and also includes damping force generating elements 94 and 95 disposed at suitable positions of the passages 92 and 93, respectively.

Further provided on the piston 81 side of the rod 75 are an annular cushion member 96 and a stopper 97 for inhibiting movement of the cushion member 96 toward the piston 81.

Liquid such as hydraulic oil is filled into the pressure chambers 79 and 80 formed within the cylinder 78 and a predetermined amount of liquid is also filled into a gap 98 formed between the cylinder 78 and the reservoir tube 82. Within the gap 98 is formed a gas chamber G2 with a liquid level O2 as a boundary and the gap 98 functions as a reservoir.

The gas chamber G2 also functions as an air spring. The pressure of gas present within the gas chamber G2 acts constantly on the liquid present within the cylinder 78 and a spring force obtained by multiplying an area by the gas pressure, the area being a difference obtained by subtracting the pressure receiving area on the pressure chamber 79 side from the pressure receiving area on the pressure chamber 80 side in the piston 81, is exerted on the rod 75, biasing the hydraulic damper E2 in the damper extending direction.

Thus, the hydraulic damper E2 is formed as a so-called double tube type. Of course, the hydraulic damper E2 may be formed as a single tube type. However, as described above, by forming the hydraulic damper E2 as a double tube type and disposing the reservoir on the outer periphery side of the cylinder, there accrues an advantage that the overall length of the hydraulic damper E2 can be shortened.

In the hydraulic damper E2, when the rod 75 moves downward in the drawing with respect to the cylinder 78, the piston 81 moves downward and expands the pressure chamber 79 and contracts the pressure chamber 80.

At this time, the liquid moves from the pressure chamber 80 into the pressure chamber 79 through the passage 93 and the damping force generating element 95. Further, the liquid in an amount corresponding to the rod intrusion volume into the cylinder 78, which liquid is surplus within the cylinder 78, flows through the passage 88 and the damping force generating element 90 into the gap 98 serving as a reservoir. At this time, the volume of the gas chamber G2 decreases due to the aforesaid entry of liquid, so that the spring force as an air spring is enhanced.

The hydraulic damper E2 generates a damping force matching a pressure loss which is produced when the liquid passes through the damping force generating elements 90 and 95.

Conversely, when the rod 75 moves upward in the drawing with respect to the cylinder 78, the piston 81 moves upward and expands the pressure chamber 80 and contracts the pressure chamber 79.

At this time, the liquid moves from the pressure chamber 79 into the pressure chamber 80 through the passage 92 and the damping force generating element 94. Further, the liquid in an amount corresponding to the volume of the rod 75 withdrawing from the interior of the cylinder 78, which amount corresponds to a deficient amount in the cylinder 78, flows out from the gap 98 serving as a reservoir, passes through the passage 89 and the damping force generating element 91 and enters the cylinder 78. The volume of the gas chamber G2 expands as a result of the aforesaid outflow of the liquid and therefore the spring force thereof as an air spring decreases.

In this case, the hydraulic damper E2 generates a damping force matching a pressure loss which is produced when the liquid passes through the damping force generating elements 91 and 94.

As the damping force generating elements 90, 91, 94 and 95 there may be used, for example, orifices or leaf valves. Any other elements may be used insofar as they exhibit the predetermined damping action.

As shown in FIG. 6, the spring bearing portion Y is positioned between the hydraulic damper E5 and the second tube 70. More specifically, the spring bearing portion Y includes an annular base 99 and a tubular guide 100 suspended from the inner periphery side of the base 99. An upper end of the base 99 is abutted against a lower end of the first tube 69 of the outer tube 67 to inhibit an upward movement in FIG. 6 of the spring bearing portion Y.

Further, an annular washer 101 is stacked on a lower end of the base 99 of the spring bearing portion Y.

The spring bearing member X is disposed below (in the drawing) each spring bearing portion Y. The spring bearing member X includes an annular connecting portion 102 connected to the rod 75, a tube portion 103 suspended from the outer periphery side of the connecting portion 102 and positioned on the outer periphery side of the hydraulic damper E2, and an annular flange portion 104 projecting on the outer periphery side of the tube portion 103.

The connecting portion 102 is formed in a bottomed tube shape and has a hole 102a axially through the bottom thereof, the hole 102a being formed so as to permit insertion of the rod 75. The bottom of the connecting portion 102 is held grippingly by a stepped portion 75a of the rod 75 and a nut 105, whereby the connecting portion 102 is connected to the rod 75. That is, the spring bearing member X is made axially immovable with respect to the rod 75.

As shown in FIGS. 5 and 6, a lower end of the connecting tube 66 is connected to the inner periphery of the connecting portion 102, for example, by press-fitting so as to become integral with the connecting portion 102, whereby the linear motion of the actuator A can be transmitted to the rod 75.

The flange portion 104 is opposed to the base 99 of each spring bearing portion Y and the spring 50 is interposed between an upper end of the flange portion 104 and the base 99 of the spring bearing portion Y, whereby the spring bearing portion Y is made immovable in the axial direction of the cylinder 78 of the hydraulic damper E2.

The spring 50 biases the spring bearing member X downward in the drawing with respect to the spring bearing portion Y. That is, it biases the hydraulic damper E2 in the damper compressing direction.

The mass borne resiliently by the spring 50 and the gas chamber G2 as an air spring becomes the total mass of spring bearing member X, connecting tube 66, ball screw nut 59, rod 75 of the hydraulic damper E2 and piston 81. Thus, the mass to be borne is lighter than in the conventional dampers.

In the damper D2, when the piston 81 moves upward in FIG. 6, the cushion member 96 provided on the rod 75 comes into abutment against the head member 83 before maximum contraction of the spring 50.

That is, the cushion member 96 exhibits its cushioning effect on condition that the distance of movement of the piston 81 from its neutral position established by the spring 50 and the gas chamber G2 as an air spring is within the total wire-to-wire spacing of spring 50 (the total extension in the entire spring of a gap length between adjacent wires). Consequently, it is possible to cushion a metal touch impact of the spring 50 and improve the vehicular ride comfort. Moreover, since the impact can be cushioned, it is possible to suppress the generation of noise in the damper D2 and prevent deterioration of the spring 50. As a result, it is also possible to expect the effect that the maintenance quantity decreases.

Although the cushion member 96 is received within the cylinder 78, there may be adopted, for example, a construction wherein a cushion member is provided at an upper end portion of the tube portion 103 of the spring bearing member X and is brought into abutment against a lower end in the drawing of the guide 100 of the spring bearing portion 100 during extension of the hydraulic damper E2.

Upon extension or contraction of the hydraulic damper E2, the spring 50 extends or contracts as well. At this time, since the spring 50 has the characteristic of rotating in the circumferential direction, the spring 50 tends to rotate in the circumferential direction with respect to the flange portion 104 of the spring bearing member X and the base 99 of the spring bearing portion Y.

This rotation of the spring 50 is not obstructed because the washer 101 stacked on the base 99 generates slippage with respect to the base 99.

That is, since the spring 50 rotates together with the washer 101 relative to the base 99, there is no fear of a wire end of the spring 50 scratching the bearing surface of the flange portion 104 for the spring 50 or the bearing surface of the base 99.

Thus, the spring bearing portion Y and the spring bearing member X are not damaged, so that it is possible to prevent deterioration of the spring bearing portion Y and the spring bearing member X. Also in this point the reliability of the damper D2 is improved.

Moreover, since the washer 101 rotates together with the spring 50, there is no exertion of torque on the flange portion 104.

That is, the torque induced by rotation of the spring 50 during extension or contraction and the torque induced by rotation of the suspension spring S during extension or contraction of the damper D2 do not act on the spring bearing member X, so that even during extension or contraction of the spring 50 and of the damper D2 the spring bearing member X maintains its stationary state in the circumferential direction and does not rotate in the same direction with respect to the rod 75. Thus, the disconnection thereof from the rod 75 is prevented.

Further, since the torque from the spring 50 does not act on the spring bearing member X itself, a greater frictional force than necessary is not developed between the grooves 66a of the connecting tube 66 and the lugs 62a of the inner tube 62. Therefore, not only smooth extension and contraction of the damper D2 are not obstructed but also it becomes possible to prevent deterioration of both connecting tube 66 and inner tube 62.

Thus, the means for permitting circumferential rotation of the spring in the damper D2 is the washer 101. By thus constructing the rotation permitting means with use of the washer 101 which is an annular member, the circumferential rotation of the spring 50 with respect to the spring bearing portion Y can be allowed in a simple manner and at low cost. As to the interposing position of the washer 101, the washer 101 may be stacked on an upper surface of the spring bearing member X.

Since the spring bearing portion Y is abutted against the lower end of the first tube 69, an initial load to be applied to the spring 50 and the gas chamber G2 as an air spring, as well as the vehicle height, can be adjusted by rotating the second tube 70 with respect to the first tube 69 and thereby making the second tube 70 move forward or backward axially with respect to the first tube 69.

By such axial forward or backward movement of the second tube 70, not only the initial load to be applied to the spring 50 and the gas chamber G2 can be changed, but also it becomes possible to change the neutral position of the piston 81 which is established by the spring 50 and the gas chamber G2.

Thus, the neutral position of the piston 81 can be changed in a simple manner without the need of replacement of the spring 50 and the gas chamber G2.

Since the neutral position of the piston 81 can thus be adjusted, it is possible to prevent the cushion member 96 from becoming inoperative. At the same time, since it is possible to adjust the initial load without replacing the spring 50 and the gas chamber T2, the characteristics of the damper D2 can be optimized to match each individual vehicle.

Moreover, since the initial load to be applied to the spring 50 and the gas chamber G2, as well as the neutral position of the piston 81, can be changed by the above operations by outside the damper D2, the adjusting operations are very easy.

Figure 7:
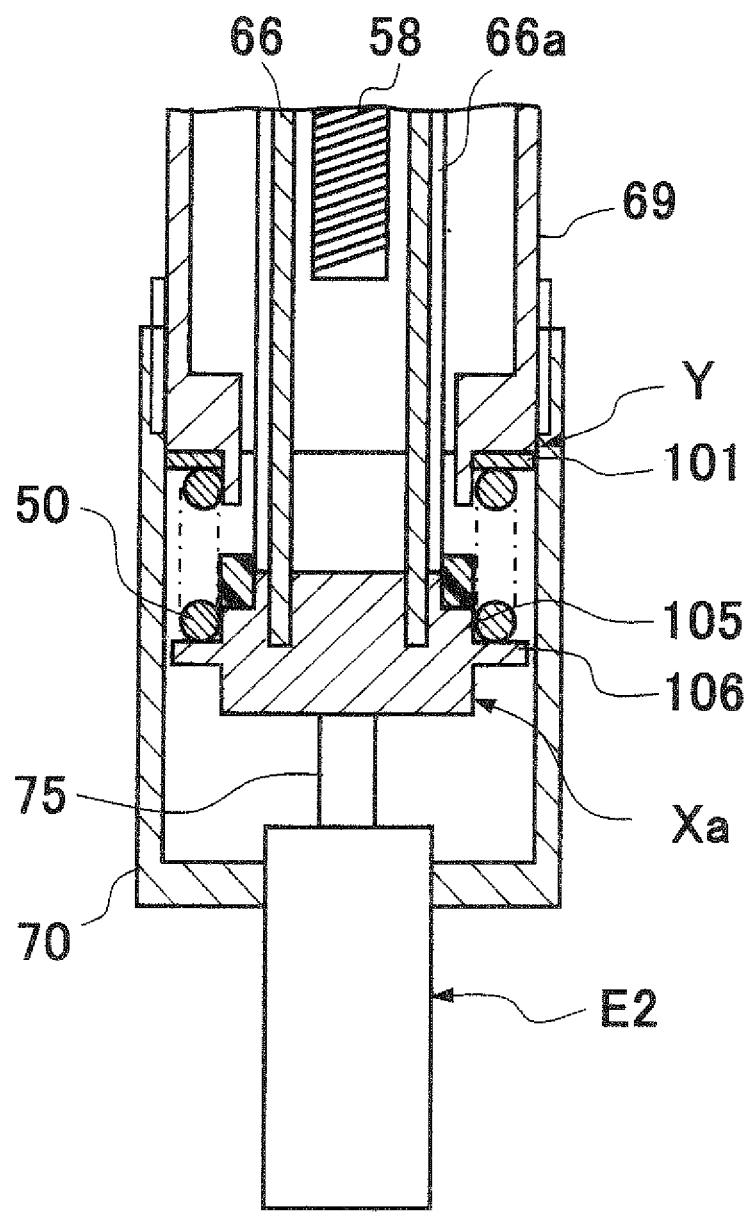
FIG. 7 is a partially enlarged, longitudinal sectional view of a damper according to a modification of the second embodiment.

As shown in FIG. 7, a spring bearing member Xa may be formed in a disc shape with flange having a disc-like body 105 and a flange portion 106 formed on the outer periphery of the body 105 to support an end portion of the spring 50 at a vertical surface thereof and be interposed between the connecting tube 66 and the rod 75.

In this case, by forming the lower end portion of the first tube 69 in approximately the same shape as the spring bearing portion Y, the function of the spring bearing portion Y can be achieved without forming the spring bearing portion Y as a separate part. Moreover, also in this case, the initial load to be imposed on the spring 50 and the gas chamber G2 and the neutral position of the piston 81 can be adjusted by moving the second tube 70 forward and backward axially with respect to the first tube 69.

Further, also in this case, since the washer 101 as rotation permitting means is stacked on the lower end of the first tube 69, it is possible to obtain the foregoing various advantages resulting from the provision of the rotation permitting means.

Thus, in the damper D2 constructed concretely, it suffices for the spring bearing member X to be inhibited its axial movement with respect to the rod 75, so there may be adopted such a construction as shown in FIG. 7. However, as noted earlier, it is better for the spring bearing member X to include the connecting portion 102, the tube portion 103 and the flange portion 104. This construction is very advantageous in that the spring 50 and the gas chamber G2 can be disposed on the outer periphery side of the hydraulic damper E2 and that therefore the overall length of the damper D2 is not affected at all.

In the construction described above, the spring members X and Xa also function to connect the rod 75 and the connecting tube 66 with each other, so that the connection of the two becomes easier. However, the spring bearing member X or Xa may be connected to either the rod 75 or the connecting tube 66 insofar as the rod 75 and the connecting tube 66 are connected together by another method.

As described above, since the connecting tube 66 of the actuator A is connected to the rod 75 of the hydraulic damper E2, the piston 81 connected to the rod 75 is put in sliding contact with the cylinder 78 fixed to the second tube 70 of the outer tube 67 and functions as a bearing, whereby axial oscillation on the lower end side of the connecting tube 66 is prevented. Besides, axial oscillation of the connecting tube 66 is prevented also by the lugs 62a of the inner tube 62 whose axial oscillation is prevented by the first tube 69. As a result, axial oscillation of the screw shaft 58 relative to the ball screw nut 59 is prevented. Consequently, even when a lateral force is inputted to the damper D2, it is possible to prevent a load from being concentrated on a particular ball (not shown) of the ball screw nut 59 and hence possible to prevent deterioration of the ball or the screw groove of the screw shaft 58.

Moreover, since it is possible to prevent deterioration of the aforesaid ball or the screw groove of the screw shaft 58, it is possible to maintain the smoothness of the rotational motion of the screw shaft 58 with respect to the ball screw nut 59 and the movement thereof in the extending/contracting direction of the damper D2, so that the function as the damper D2 is not impaired. Also in this point the reliability of the damper D2 is improved by adopting the construction in question.

Besides, since the hydraulic damper E2 is formed as a double tube type, it is possible to shorten the overall length of the damper D2. Additionally, since the spring 50, the spring bearing portion Y and the spring bearing member X are disposed on the outer periphery side of the hydraulic damper E2 and the air spring is formed by the gas chamber G2, the spring 50 and the gas chamber G2 exert no influence on the overall length of the damper D2 as described above. Therefore, coupled with the point that the hydraulic damper E2 is a double tube type, the overall length of the damper D2 can be kept to a minimum. As a result, even in the damper D2 wherein the actuator A is connected in series with the hydraulic damper E2, not only it becomes easy to secure stroke, but also the onboard-characteristic of the damper to the vehicle is also improved.

Further, since the outer tube 67 is made up of two members which are the first tube 69 and the second tube 70, the second tube 70 accommodating the hydraulic damper E2, spring 50, spring bearing portion Y and spring bearing member X connected to the hydraulic damper E2, the actuator A side and the hydraulic damper E2 side can be mounted each as an assembly at the time of mounting parts.

More particularly, since the actuator A is an electric device including the motor M, while the hydraulic damper E2 is a hydraulic device, both may be manufactured on different production lines. However, since both can be made assemblies respectively, even if they are manufactured in different factories, the damper D2 as the final product can be manufactured by merely combining the two. In this point there accrues an advantage and the mounting work becomes easier.

In the damper D2 constructed as above, when the vehicular sprung member and unsprung member undergo a force from a road surface and perform a linear relative motion, the ball screw nut 59 connected to the axle side and the screw shaft 58 connected to the sprung member side perform a linear relative motion. This relative motion is converted to a rotational motion of the screw shaft 58 in the manner described above, which rotational motion is transmitted to the rotor of the motor M.

When the rotor of the motor M performs its rotational motion, the winding in the motor M crosses the magnetic field of the magnet and an induced electromotive force is generated in the winding, thereby causing the motor M to regenerate energy and generate an electromagnetic force. As a result, rotational toque induced by the electromagnetic force resulting from the induced electromotive force acts on the rotor of the motor M and suppresses the rotational motion of the rotor.

This rotor rotation suppressing action suppresses the rotational motion of the screw shaft 58. Since the rotational motion of the screw shaft 58 is thus suppressed, the linear motion of the ball screw nut 59 is suppressed. In this case, with the aforesaid electromagnetic force, the damper D2 generates a control force which acts as a damping force, thereby absorbing and cushioning the oscillation energy.

At this time, in case of supplying the winding with an electric current positively from an external power supply, the extension or contraction of the damper D2 can be controlled freely by adjusting the rotational torque acting on the rotor, that is, it can be controlled freely within the range in which the control force for the damper D2 can be produced. Thus, it is possible to make the damping characteristics of the damper D2 variable or make the damper D2 function as an actuator. In case of making the damper D2 function as an actuator to match the damping force caused by the foregoing energy regeneration and making an appropriate control, it is also possible to let the damper D2 function also as an active suspension.

In the case where it is not necessary to let the damper D2 function as an actuator positively, that is, if a mere generation of the damping force suffices, it goes without saying that it is not necessary to connect the motor M to an external power supply and that the linear relative motion between the screw shaft 58 and the ball screw nut 59 may be suppressed by the induced electromotive force which is created in the winding when the rotor of the motor M is rotated forcibly, that is, by the rotational torque attributable to the electromagnetic force resulting from only the regeneration of energy.

In the damper D2, since the hydraulic damper E2 is disposed on the unsprung member side, even if a high-frequency oscillation is inputted to the unsprung member from a road surface and cannot be absorbed by the actuator A as described above, the high-frequency oscillation is absorbed by the hydraulic damper E2, and with the spring 50 and the gas chamber G2, the transfer of the oscillation to the sprung member side can be suppressed.

Therefore, also in the damper D2 constructed concretely, even when a high-frequency oscillation such as, for example, oscillation of a relatively large acceleration is inputted to the unsprung member in the case where the vehicle is running on a bad road or strikes on a projection of a road surface, there is obtained the effect that the vehicular ride comfort is not impaired.

In the damper D2, moreover, since the gas chamber G2 as a reservoir formed in the hydraulic damper E2 is utilized as it is as an air spring, it is possible to reduce the cost without the need of forming an air spring in the damper D2.

Besides, since one of the two spring elements is an air spring, it is possible to reduce the weight of the damper D2. Additionally, since the gas chamber G2 formed in the hydraulic damper E2 is used as an air spring, any special space for mounting the air spring is not needed and hence it is possible to reduce the size of the damper D2.

Further, with the washer 101 as rotation permitting means, the torque of the spring 50 is not transmitted to the connecting tube 66 and it is possible to suppress the frictional force developed between the grooves 66a of the connecting tube 66 and the lugs 62a of the inner tube 62, not obstructing a smooth extending or contracting motion of the actuator A. Thus, the vehicular ride comfort can be surely improved because the absorption or the suppression of the oscillation is performed smoothly.

A brief description will now be given about the damping force based on the moment of inertia. The damping force developed on the actuator A side of the damper D2 is approximately the total sum of a force acting axially of the damper D2, which force is induced by the moment of inertia of the screw shaft 58, that of the rotor of the motor M and that of the ball screw nut 59 and an electromagnetic force generated by the motor M. Particularly, the force induced by the moment of inertia of the rotating system becomes large in proportion to the acceleration of the extending/contracting motion of the damper D2 because the angular acceleration of the rotor of the motor M is proportional to the acceleration of the extending/contracting motion of the damper D2. However, the moment of inertia of the rotor and that of the screw shaft 58 are relatively large and the influence thereof on the damping force is unignorable.

Since the force based on the moment of inertia of the rotor and that of the screw shaft 58 is proportional to the acceleration of the extending/contracting motion as described above, it acts in a direction opposed to the axial force of the damper D2 which force is inputted to the damper D2 from a road surface for example. As a result, the damper D2 generates a damping force not dependent on the electromagnetic force of the motor M. Particularly, upon input of an abrupt axial force, the damper D2 produces a higher damping force, resulting in that an occupant in the vehicle will have a rugged feeling.

Thus, the damping force based on the moment of inertia of the rotor and that of the screw shaft 58 is generated always in advance of the damping force dependent on the electromagnetic force. Besides, the damping force induced by the moment of inertia of the rotor and that of the screw shaft 58, which force depends on the acceleration of the extending/contracting motion of the damper D2, is difficult to be controlled, so that the smaller the moment of inertia of the rotor and that of the screw shaft 58, the greater the degree of suppression for the influence of the moment of inertia of the rotor and that of the screw shaft 58 on the damping force. However, as noted earlier, the force acting in the axial direction of the damper D2 on the basis of the moment of inertia of the rotor and that of the screw shaft 58 is absorbed by the hydraulic damper E2, the spring 50 and the gas chamber G2 as an air spring, so that the transfer of oscillation large in acceleration to the sprung member is suppressed, whereby the vehicular ride comfort is improved.

Further, even when a high-frequency oscillation acts on the unsprung member, since the large mass of the motor M and that of the screw shaft 58 are not included in the mass supported by the spring 50 and the gas chamber G2 as an air spring and the mass supported by the spring 50 and the gas chamber G2 is light in comparison with that in the conventional dampers, the force for transmitting the input of oscillation in the unsprung member to the sprung member is also small as a result of the above reduction of mass and hence it is possible to improve the vehicular ride comfort.

Moreover, the natural frequency also becomes high as a result of reduction of the mass borne by the spring 50 and the gas chamber G2 as an air spring, so that there is no fear of resonance with the frequency in the range in which the occupant in the vehicle has a bad feeling as to ride comfort. Also in this point it is possible to improve the ride comfort in the vehicle.

Further, since the hydraulic damper E2 is disposed on the unsprung member side, the mounting space for the hydraulic damper E2 need not be ensured inside the vehicle body. That is, the motor M can be fixed inside the vehicle body. Consequently, the length of a relative motion area of the damper D2 becomes equal to the overall length of the damper D2 minus the length of the motor M and hence it becomes easy to ensure the stroke of the damper D2. That is, in comparison with the case where the motor M is attached to the underside, i.e., outside, of the vehicle body, the stroke can be taken longer by an amount corresponding to the length of the motor M.

Besides, since the motor M can be disposed inside the vehicle body electric wires (not shown) which will be extended from electrodes of the motor M can be laid inside the vehicle body and it becomes easier to connect the electric wires to external controller and control circuit. Since the electric wires in question are accommodated within the vehicle body, it becomes possible to lessen the chance of deterioration of the electric wires.

Moreover, since the motor M is fixed inside the vehicle body, the damper D2 can be mounted on the vehicle without changing its vehicle body-side mounting position. Consequently, the vehicle body-side mounting position can be standardized, thus permitting reduction of the cost. Besides, since a shocking load in full bounding is transmitted to the vehicle body through the aforesaid mounting portion, there also accrues an advantage that it is possible to prevent a large force from acting on the motor M.

Further, also in the concretely-constructed damper D2, the hydraulic damper E2 can be disposed in an inverted state on condition that the rod 75 is connected to the second tube 70 and the cylinder 78 connected to the connecting tube 66 and that the spring bearing member X is installed so as to be axially immovable with respect to the cylinder 78.

Figure 8:
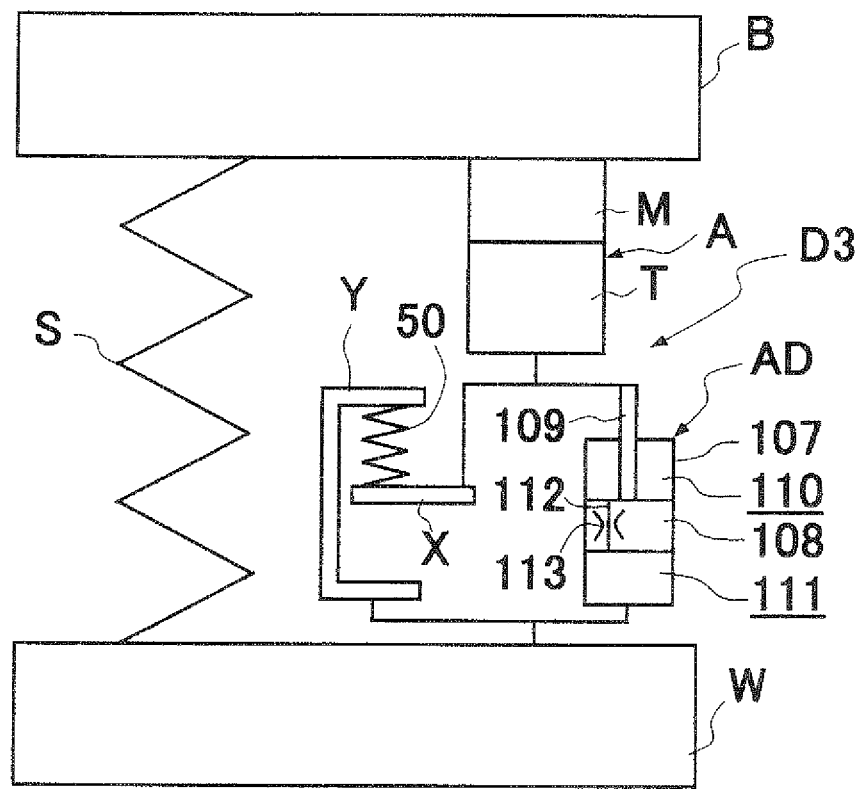
FIG. 8 is a conceptual diagram of a damper according to a third embodiment of the present invention.

In the above description the damper D2 is made up of the hydraulic damper E2 also serving as the air spring 51 connected to the unsprung member W, the actuator A connected in series with the hydraulic damper E2 and also connected to the sprung member B side, and the spring 50 interposed between the actuator A and the unsprung member W and in parallel with the hydraulic damper E2, the spring 50 biasing the hydraulic damper E2 in the damper compressing direction. However, the hydraulic damper E2 may be substituted by an air damper AD which also serves as an air spring, as in a damper D3 according to a third embodiment of the present invention which is illustrated in FIG. 8.

The air damper AD includes a cylinder 107, a piston 108 inserted slidably into the cylinder 107, and a rod 109 connected at one end thereof to the piston 108 and connected at an opposite end thereof to a spring bearing member X. In the piston 108 there are provided a passage 112 for communication between pressure chambers 110 and 111 defined by the piston 108 within the cylinder 107, as well as a damping force generating element 113 located at a suitable position in the passage 112.

Figure 9:
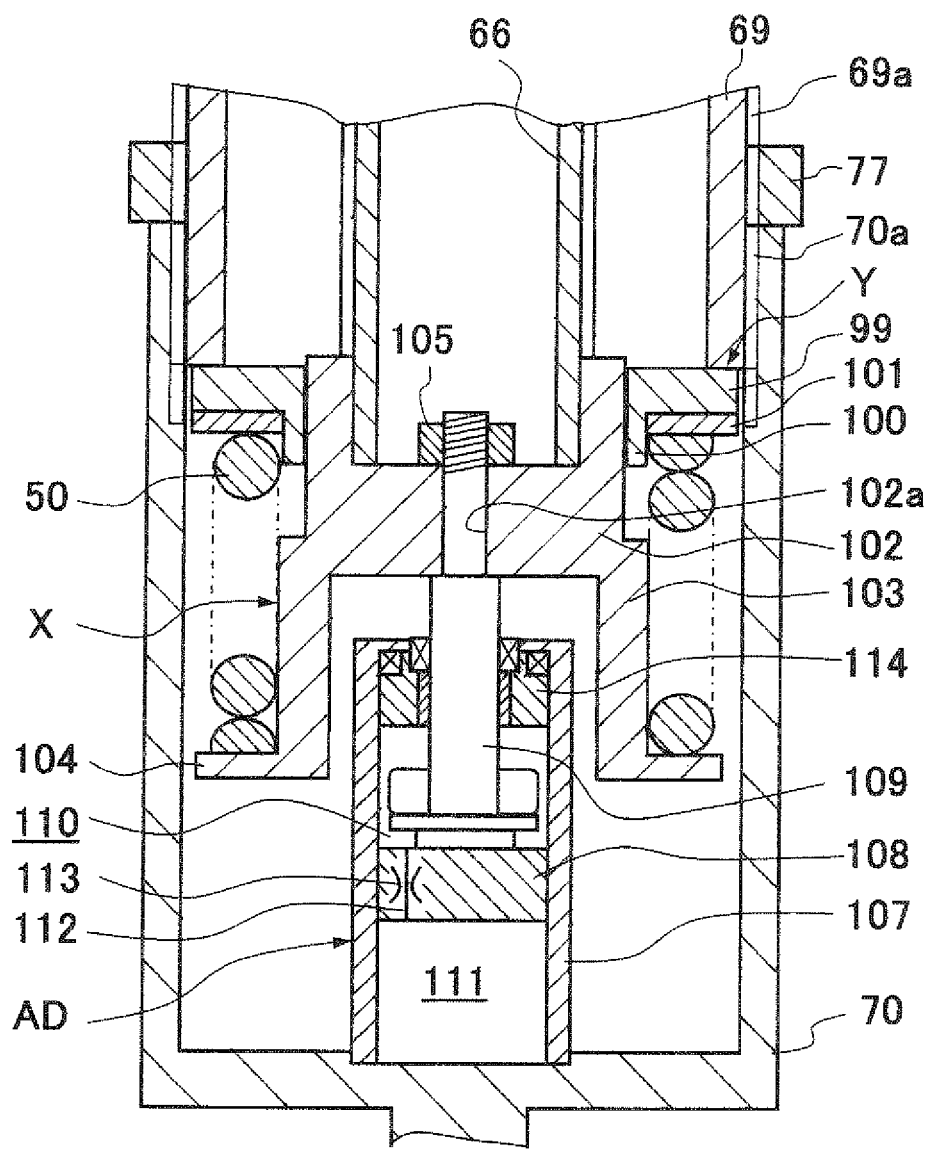
FIG. 9 is a partially enlarged, longitudinal sectional view of the damper of the third embodiment.

More specifically, as shown in FIG. 9, a lower end of the cylinder 107 is connected to the bottom of a second tube 70, while an upper end thereof, which corresponds to the opposite end of the rod 109, is connected to a connecting tube 66 of an actuator A through a spring bearing member X in the damper D3. The upper end in question is closed with a head member 114 which supports the rod 109.

A predetermined amount of gas is sealed into each of the pressure chambers, 110 and 111 in the cylinder 107 so that the air damper AD creates a predetermined air spring force.

The area of the air damper AD facing the pressure chamber 111 in the piston 108 is larger by an amount corresponding to the sectional area of the rod 109 than the area thereof facing the pressure chamber 110, so that an air spring force which biases the piston 108 in an extending direction acts on the air damper AD constantly. The air damper AD not only exhibits a damping force when it extends or contracts but also acts as an air spring which exhibits a spring force in the extending direction of the piston.

Even after such substitution of the hydraulic damper E2 by the air damper AD, the piston 108 of the air damper AD is supported resiliently from both vertical sides in FIGS. 8 and 9 by the spring 50 and the air spring force of the air damper AD itself.

Thus, even after the substitution of the hydraulic damper EQ by the air damper AD, as is the case with the adoption of the air damper EQ, the air damper not only functions to suppress the transfer of a high-frequency oscillation of an unsprung member W to the actuator A i.e. sprung member B side, but also can exhibit the action of bringing back the piston 108 to a predetermined position with respect to the cylinder 107.

That is, such an inconvenience encountered in the conventional dampers as the interference of the piston with the cylinder, resulting in deterioration of the ride comfort in the vehicle or of the reliability of the damper is eliminated.

In this case, unlike the hydraulic damper E2, it is not necessary to fill liquid such as hydraulic oil into the cylinder 107 and the total weight of the damper DS can be so much reduced. In the case of the air damper AD, unlike the hydraulic damper E2, the provision of a reservoir is not needed, so it is possible to form the air damper AD as a single tube type and hence possible to make the air damper AD itself smaller in size than the hydraulic damper E2. Consequently, the size of the damper D3 can be made smaller than in the adoption of the hydraulic damper E2 and it is possible to reduce the manufacturing cost of the damper D3. In the case of the air damper AD, the overall length thereof can be made short because such a reservoir as in the case of the hydraulic damper E2 is not required even if the air damper is formed as a single tube type. Also in this point there accrues an advantage because the overall length of the damper D3 is not made long.

Moreover, since the weight of the damper DS connected to the unsprung member W can be made lighter than in the adoption of the hydraulic damper E2, it is possible to diminish the oscillation transfer gain for the sprung member B and further improve the ride comfort in the vehicle. Besides, since the oscillation transfer suppressing effect for the actuator A side is enhanced, the reliability of the damper D3 is further improved.

The damper D3 of this third embodiment is basically the same as the damper D2 of the second embodiment. The only difference is a mere replacement of the hydraulic damper E2 with the air damper AD. Therefore, the other advantages of the damper D2 using the hydraulic damper E2 than the advantages resulting from the replacement with the air damper AD are not lost. In other words, the damper D3 possesses the same advantages and exhibit the same functions and effects as those of the damper D2 using the hydraulic damper E2.

There may be adopted a modification wherein, as in the hydraulic damper E2, two passages for communication between the pressure chambers 110 and 111 are formed in the piston 108 of the air damper AD and damping force generating elements 94 and 95 are disposed at suitable positions of those passages respectively.

Figure 10:
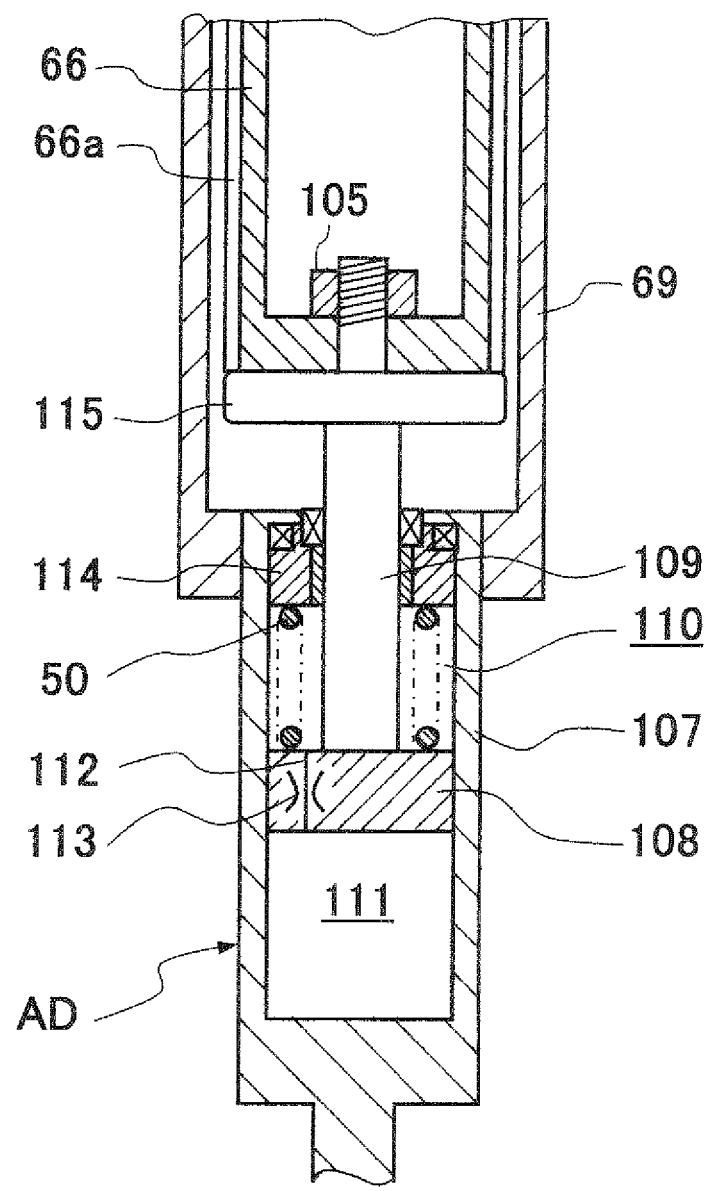
FIG. 10 is a partially enlarged, longitudinal sectional view of a damper according to a modification of the third embodiment.

As shown in FIG. 10, a spring 50 may be interposed between the head member 114, the head member 114 not only closing an end portion of the cylinder 107 but supporting the rod 109, and the piston 108. In this case, the foregoing spring bearing member X and spring bearing portion Y can be omitted and it also becomes possible to omit the second tube 70 by for example inserting the cylinder 107 movably into the first tube 69. Thus, the damper D3 can be further reduced in weight and slimmed. In this case, it is preferable that a cushion member 115 be disposed at a lower end of the connecting tube 66, whereby a direct collision between the connecting tube 66 and the cylinder 107 can be prevented and it is possible to cushion a shock.

In the damper illustrated in FIG. 10, an annular member such as a washer for example may be disposed between the spring 50 and the piston 108 and/or between the spring 50 and the head member 114, though not shown, and may be used as means for permitting circumferential rotation of the spring 50. In this case, the annular member can perform the same function and effect as that of the washer 101 which is the rotation permitting means described above.

Embodiments of the present invention have been described above, but it goes without saying that the scope of the present invention is not limited to the details illustrated in the drawings or described above.

INDUSTRIAL APPLICABILITY

The damper of the present invention is applicable to the vehicular suspension.

What is claimed is:

1. A damper comprising:
   an actuator connected to a sprung member side of a vehicle, said actuator having a motion converting mechanism for converting a linear motion into a rotational motion and a motor to which the rotational motion resulting from the conversion by said motion converting mechanism is transmitted;
   a hydraulic damper, said hydraulic damper having a cylinder, a piston inserted slidably into said cylinder and defining two pressure chambers within said cylinder, and a rod connected at one end thereof to said piston, the linear motion of said actuator being transmitted to one of said rod and said cylinder, the other of the rod and the cylinder being connected to an unsprung member side of the vehicle;
   a spring accommodated within one of said pressure chambers and biasing said hydraulic damper in a damper compressing direction;
   a spring accommodated within the other pressure chamber and biasing said hydraulic damper in a damper extending direction;
   a first spring bearing member arranged in one of said pressure chambers, said first spring bearing member being connected to one portion of said rod such that said first spring bearing member is rotatable relative to said rod; and
   a second spring bearing member arranged in another one of said pressure chambers, said second spring bearing member being connected to another portion of said rod such that said second spring bearing member is rotatable relative to said rod.

2. A damper according to claim 1, wherein said piston is held grippingly from both end sides by said springs.

3. A damper according to claim 1, wherein said hydraulic damper includes a reservoir on the outer periphery side of said cylinder.

4. A damper according to claim 1, further comprising means for permitting circumferential rotation of said spring(s).

5. A damper according to claim 2, wherein said hydraulic damper includes a reservoir on the outer periphery side of said cylinder.

6. A damper according to claim 1, further comprising:
a cushion member connected to said rod, said cushion member being arranged between said hydraulic damper and said actuator.

7. A damper according to claim 6, wherein at least a portion of said hydraulic damper is located adjacent to said unsprung member side of the vehicle.

8. A damper according to claim 1, wherein said spring accommodated within said one of said pressure chambers is connected to said first spring bearing member such that said spring accommodated within said one of said pressure chambers rotates relative to said rod, said spring accommodated within said other of said pressure chambers being connected to said second spring bearing member such that said spring accommodated within said other of said pressure chambers rotates relative to said rod.

9. A damper according to claim 1, wherein said cylinder is located at a spaced location from said motion converting mechanism.

10. A damper comprising:
an actuator connected to a sprung member side of a vehicle, said actuator having a motion converting mechanism for converting a linear motion into a rotational motion and a motor to which the rotational motion resulting from the conversion by said motion converting mechanism is transmitted, said motion converting mechanism comprising a screw shaft and a ball screw nut, said screw shaft being connected to said motor and said ball screw nut, said actuator further comprising a connecting tube and a second tube, said ball screw nut being non-rotatably connected to an upper end of said second tube, said second tube being connected to said connecting tube, wherein said connecting tube is non-rotatable with respect to said second tube;
a hydraulic damper, said hydraulic damper having a cylinder, a piston inserted slidably into said cylinder and defining two pressure chambers within said cylinder, and a rod connected at one end thereof to said piston, said rod being connected at another end thereof to said motion converting mechanism, the linear motion of said actuator being transmitted to one of said rod and said cylinder, the other of the rod and the cylinder being connected to an unsprung member side of the vehicle;
a first spring accommodated within a first one of said pressure chambers and biasing said hydraulic damper in a damper compressing direction;
a second spring accommodated within a second one of said pressure chambers and biasing said hydraulic damper in a damper extending direction;
a first spring bearing member arranged in said first one of said pressure chambers, said first spring bearing member being connected to one portion of said rod such that said first spring bearing member is rotatable relative to said rod; and
a second spring bearing member arranged in said second one of said pressure chambers, said second spring bearing member being connected to another portion of said rod such that said second spring bearing member is rotatable relative to said rod.

11. A damper according to claim 10, further comprising:
a cushion member connected to said rod, said cushion member being arranged between said hydraulic damper and said actuator.

12. A damper according to claim 10, further comprising:
a cushion member, said cushion member engaging said motion converting mechanism.

13. A damper according to claim 10, wherein at least a portion of said hydraulic damper is located adjacent to said unsprung member side of the vehicle.

14. A damper according to claim 10, wherein said first spring is connected to said first spring bearing member such that said first spring accommodated rotates relative to said rod, said second spring being connected to said second spring bearing member such that said second spring rotates relative to said rod.

15. A damper according to claim 10, wherein said cylinder is located at a spaced location from said motion converting mechanism.

16. A damper comprising:
an actuator connected to a sprung member side of a vehicle, said actuator comprising a motor, a screw shaft, a ball screw nut, a connecting tube and a second tube, said screw shaft being connected to said motor and said ball screw nut, said ball screw nut being non-rotatably connected to an upper end of said second tube, said second tube being connected to said connecting tube, wherein said connecting tube is non-rotatable with respect to said second tube, said screw shaft and said ball screw nut defining a motion converting mechanism for converting a linear motion into a rotational motion, wherein said the rotational motion resulting from the conversion by said motion converting mechanism is transmitted to said motor;
a hydraulic damper, said hydraulic damper having a cylinder, a piston and a rod, said cylinder being located at a spaced location from said second tube, said piston being inserted slidably into said cylinder, at least a portion of said cylinder defining two pressure chambers within said cylinder, said rod comprising a first rod end portion and a second rod end portion, said first rod end portion being connected to said piston, said second rod end portion being connected to said second tube, the linear motion of said actuator being transmitted to one of said rod and said cylinder, the other of the rod and the cylinder being connected to an unsprung member side of the vehicle;
a first spring accommodated within a first one of said pressure chambers and biasing said hydraulic damper in a damper compressing direction;
a second spring accommodated within a second one of said pressure chambers and biasing said hydraulic damper in a damper extending direction;
a first spring bearing member arranged in said first one of said pressure chambers, said first spring bearing member being connected to one portion of said rod such that said first spring bearing member is rotatable relative to said rod; and
a second spring bearing member arranged in said second one of said pressure chambers, said second spring bearing member being connected to another portion of said rod such that said second spring bearing member is rotatable relative to said rod.

17. A damper according to claim 16, wherein said first spring is connected to said first spring bearing member such that said first spring accommodated rotates relative to said rod, said second spring being connected to said second spring bearing member such that said second spring rotates relative to said rod, said second tube having a diameter that is less than a diameter of said connecting tube.

* * * * *